United States Patent
Sato et al.

(10) Patent No.: US 8,083,035 B2
(45) Date of Patent: Dec. 27, 2011

(54) CYLINDER APPARATUS AND DISK BRAKE

(75) Inventors: Tomoji Sato, Minami-Alps (JP);
Keisuke Nanri, Minami-Alps (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 12/078,273

(22) Filed: Mar. 28, 2008

(65) Prior Publication Data

US 2008/0289916 A1   Nov. 27, 2008

Related U.S. Application Data

(62) Division of application No. 11/347,258, filed on Feb. 6, 2006.

(30) Foreign Application Priority Data

Feb. 7, 2005   (JP) ................................ 2005-030286

(51) Int. Cl.
*F16D 55/02*   (2006.01)
*F16D 65/00*   (2006.01)

(52) U.S. Cl. ........................ 188/73.1; 188/71.1; 188/370

(58) Field of Classification Search ................ 188/71.1, 188/73.1, 370, 73.47, 73.46; 228/112.1, 228/2.1

See application file for complete search history.

(56) References Cited

U.S. PATENT DOCUMENTS

| | | |
|---|---|---|
| 5,460,317 A | 10/1995 | Thomas et al. |
| 5,819,886 A | 10/1998 | Null |
| 5,826,686 A | 10/1998 | Rike |
| 5,964,321 A | 10/1999 | Hinkens |
| 6,092,631 A | 7/2000 | Matsuzak et al. |
| 6,367,595 B1 | 4/2002 | Mori et al. |
| 6,676,008 B1 * | 1/2004 | Trapp et al. ................ 228/112.1 |
| 2002/0166736 A1 | 11/2002 | Yunba |
| 2005/0051390 A1 | 3/2005 | Toyoda et al. |
| 2005/0115780 A1 | 6/2005 | Nanri |

FOREIGN PATENT DOCUMENTS

| | | |
|---|---|---|
| EP | 1 122 453 | 8/2001 |
| EP | 1 132 167 | 9/2001 |
| EP | 1 256 740 | 11/2002 |
| GB | 1 387 833 | 3/1975 |
| GB | 2 131 507 | 6/1984 |
| JP | 5-64542 | 8/1993 |
| JP | 6-69456 | 9/1994 |
| JP | 11-197855 | 7/1999 |
| JP | 2001-246482 | 9/2001 |

OTHER PUBLICATIONS

Japanese Office Action with English translation issued Nov. 24, 2010 in corresponding Japanese Application No. 2006-048842.

* cited by examiner

*Primary Examiner* — Bradley King
*Assistant Examiner* — Thomas Irvin
(74) *Attorney, Agent, or Firm* — Wenderoth, Lind & Ponack, L.L.P.

(57) ABSTRACT

A method of manufacturing a cylinder apparatus wherein although an opening of a cylinder body is closed by a covering member, processing and parts costs are reduced, fluid leakage is prevented, and the apparatus can be reduced in size. The cylinder apparatus includes a piston (17) which is caused to slidingly move in a bore (26) of a cylinder (21). The cylinder 21 includes a covering member (43) provided in a bottom portion (42) of the cylinder (21), and a cylinder body (46) having an opening that is closed by the covering member (43). The covering member (43) is friction stir welded to the cylinder body (46).

20 Claims, 13 Drawing Sheets

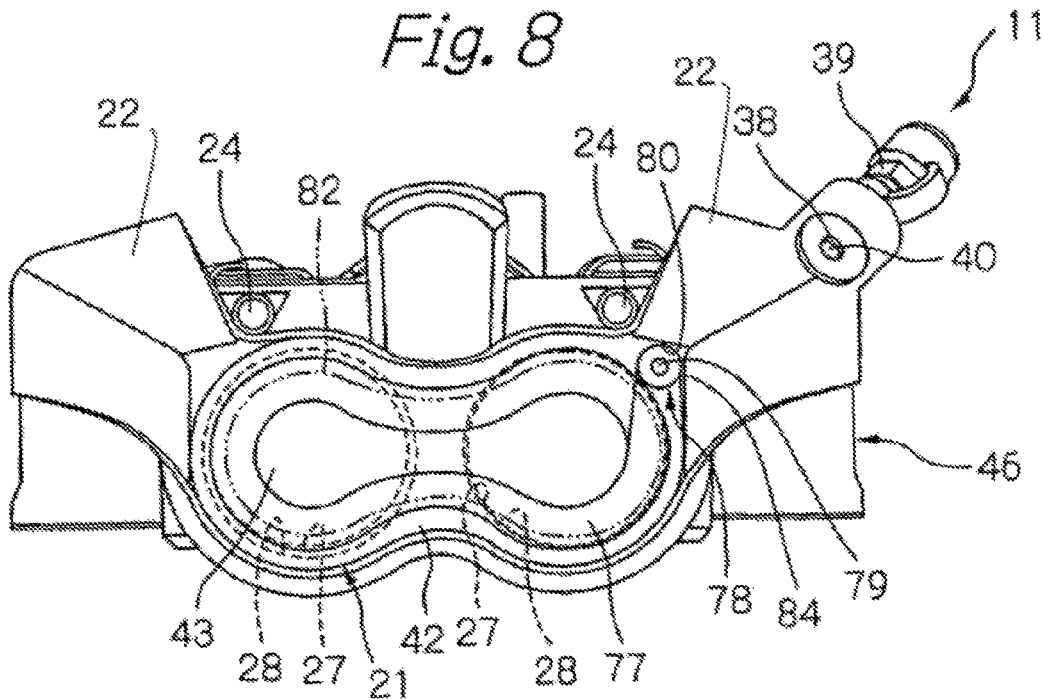
Fig. 8
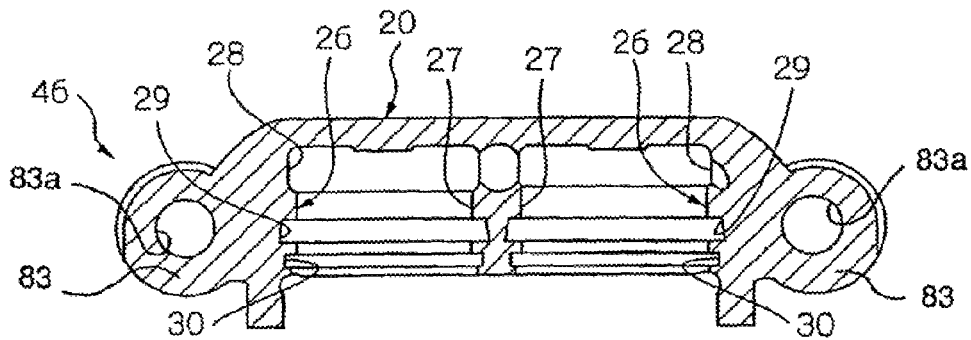
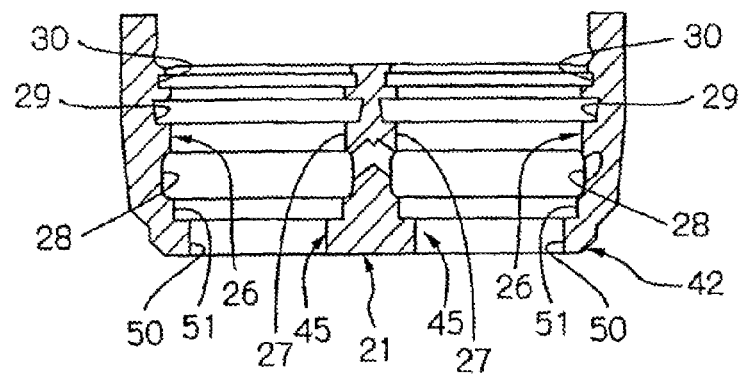
Fig. 9

(a)          (b)

US 8,083,035 B2

CYLINDER APPARATUS AND DISK BRAKE

This is a divisional application of Ser. No. 11/347,258, filed Feb. 6, 2006.

BACKGROUND OF THE INVENTION

The present invention relates to a cylinder apparatus and a disk brake.

As an example of a cylinder apparatus in which a piston slidingly moves in a cylinder, there is known a disk brake wherein a braking operation is effected by causing a piston to slidingly move in a cylinder under application of a hydraulic pressure, whereby the piston is pushed outward relative to the cylinder against a brake pad, which in turn is brought into contact with a brake disk. To facilitate a process of forming an interior of a cylinder of such a disk brake, a cylinder may be divided into a covering member, which is provided in a bottom portion of the cylinder, and a cylinder body that has an opening which is closed by the covering member. In using this configuration, a process of forming an interior of the cylinder body is performed through the opening, after which the covering member is attached to the cylinder body so as to close the opening. Attachment of the covering member is effected by screwing the covering member into the opening of the cylinder body (refer to, for example, Japanese Utility Model Public Disclosure No. HEI 05-64542 and Japanese Utility Model Public Disclosure No. HEI 06-69456).

However, in a connecting structure such as that of the above-mentioned cylinder, in which a cover member is screwed into an opening of a cylinder body, it is necessary to form a male thread on the covering member and a female thread on the cylinder body. Further, it is also necessary to form a tool-attaching portion such as a hexagonal socket for applying a force to the covering member to connect it to the cylinder body. To ensure sufficient strength, when a tool-attaching portion such as a hexagonal socket is employed, it is necessary to increase a thickness of the covering member. Further, it is necessary to form threads and a seal groove. As a result, an axial dimension of the cylinder increases. In employing such a configuration, it is also necessary to provide the covering member or the cylinder body with a seal ring for sealing a gap between the covering member and the cylinder body. Provision of the seal ring necessitates formation of a seal groove for holding the seal ring. This significantly increases processing costs. Further, use of a seal ring causes an increase in an overall number of parts used, and, therefore, a corresponding increase in parts' costs. Further, use of a seal ring gives rise to a danger of fluid loss (fluid leakage) due to elastic deformation or the like of the seal ring. These problems relate not only to disk brakes, but also to a variety of other cylinder apparatuses in which a structure is employed wherein an opening of a cylinder body is closed by a covering member.

Therefore, an object of the present invention is to provide a cylinder apparatus and a disk brake wherein although an opening of a cylinder body is closed by a covering member, the cylinder apparatus and disk brake are leak proof and can be reduced in size, and processing and parts' costs are also kept low.

SUMMARY OF THE INVENTION

To achieve the above-stated object, the present invention provides a cylinder apparatus in which a piston is caused to slidingly move in a bore of a cylinder, the cylinder comprising a covering member, which is provided in a bottom portion of the cylinder, and a cylinder body having an opening that is closed by the covering member, wherein the covering member is friction stir welded to the cylinder body.

In the cylinder apparatus of the present invention, the covering member and the cylinder body may be connected to each other by friction stir welding an entire periphery of the covering member to form a connecting portion that surrounds the covering member in the form of a closed loop, the connecting portion connecting the covering member and the cylinder body.

In the cylinder apparatus according to the present invention, the covering member in the bottom portion of the cylinder apparatus is friction stir welded to the cylinder body. This makes it possible to hermetically integrate the covering member with the cylinder body and, therefore, eliminates the need for: forming threads on the covering member and the cylinder body; providing a seal groove; providing a hexagonal socket or the like for engagement with a welding tool; and so on. As a result, processing costs can be reduced, and the apparatus can be reduced in size. Further, since a seal ring is not required, the parts' costs can be reduced. Moreover, fluid leakage associated with seal ring degradation due to ageing is avoided. Further, compared to a structure in which separate component parts are employed, use of an integral structure of the present invention formed by the covering member and the cylinder body enables a hermetic sealing state to be reliably maintained, which further ensures that there is no fluid leakage. In addition, integration of the covering member and the cylinder body enables a number of parts used to be reduced, resulting in correspondingly lower management costs. Further, since use of friction stir welding enables parts to be connected at a relatively low temperature, highly precise dimensions for a processed cylinder apparatus can be obtained.

In the cylinder apparatus according to the present invention, the covering member may be friction stir welded to the cylinder body in such a way that the opening of the cylinder body is closed by the covering member from outside the cylinder body. In this case, the covering member is pressed against the cylinder body from outside the cylinder body, while friction stir welding is also performed from outside the cylinder body. Therefore, the pressing of the covering member against the cylinder body can be made easier because it can be done from outside the cylinder body.

Alternatively, the covering member may be friction stir welded to the cylinder body in such a way that the opening of the cylinder body is closed by the covering member from inside the cylinder body. In this case, the covering member can be friction stir welded to the cylinder body from outside the cylinder body, while the covering member is pressed from inside the cylinder body. In such a case, interference between a mechanism used for pressing the covering member and that used for performing friction stir welding need not be taken into consideration.

Further, an end position of a friction stir welding process, in which the covering member is friction stir welded to the cylinder body, may be displaced from a connection boundary between the cylinder body and the covering member. In this case, when the covering member is friction stir welded to the cylinder body, the end position of the friction stir welding process where an impression of a welding tool remains can be displaced from the connection boundary between the cylinder body and the covering member, which ensures that fluid loss through a portion at the end position of the friction stir welding process does not occur, and also ensures that no reduction in strength occurs.

Further, a central hole that is formed in an end position of a friction stir welding process, in which the covering member is friction stir welded to the cylinder body, may be located outside an inner diameter portion of the bore. In this way, the central hole that is formed at the end position by the welding tool when the covering member is friction stir welded to the cylinder body can be located outside the inner diameter portion of the bore. Therefore, there is no danger of either fluid loss through the central hole or of any reduction in strength.

The end position may be located at a position on a line extending in a direction tangential to the bore. In this way, any unnecessary movement of the tool can be avoided, and a time required for the friction stir welding process can be reduced.

The present invention further provides a disk brake in which a piston is caused to slidingly move in a bore of a cylinder and thereby press a brake pad against a disk, the cylinder comprising a covering member, which is provided in a bottom portion of the cylinder, and a cylinder body having an opening that is closed by the covering member, wherein the covering member is friction stir welded to the cylinder body.

In the disk brake, the covering member and the cylinder body may be welded to each other by friction stir welding an entire periphery of the covering member to form a connecting portion that surrounds the covering member in the form of a closed loop, the connecting portion connecting the covering member and the cylinder body.

According to the disk brake of the present invention, the covering member in the bottom portion of the disk brake is friction stir welded to the cylinder body. This makes it possible to hermetically integrate the covering member with the cylinder body and, therefore, eliminates the need for forming threads on the covering member and the cylinder body, a seal groove, a hexagonal socket or the like for engagement with a connecting tool, and the like. As a result, processing costs can be reduced, and the apparatus can be reduced in size. Further, since a seal ring is not required, the parts' cost can be reduced. Moreover, fluid leakage associated with elastic deformation of the seal ring is avoided. Further, compared to a structure in which separate component parts are employed, use of an integral structure of the present invention formed by the covering member and the cylinder body enables a hermetic sealing state to be reliably maintained, which further ensures that there is no fluid leakage. In addition, the integration of the covering member and the cylinder body enables a number of parts used to be reduced, resulting in correspondingly lower management costs.

In the disk brake, the covering member may be friction stir welded to the cylinder body in such a way that the opening of the cylinder body is closed by the covering member from outside the cylinder body. In this case, the covering member is pressed against the cylinder body from outside the cylinder body, while friction stir welding is also performed from outside the cylinder body. Therefore, the pressing of the covering member against the cylinder body can be made easier because it can be pressed from outside the cylinder body.

The cylinder may comprise a plurality of bores that are disposed in parallel, wherein the covering member is friction stir welded to the cylinder body, such that a single covering member covers a single opening, which extends over the plurality of bores, from outside the cylinder body. In this case, the opening can be closed by use of a single covering member, even in a case that a plurality of bores are disposed in parallel.

In the disk brake according to the present invention, the covering member may be friction stir welded to the cylinder body in such a way that the opening of the cylinder body is closed by the covering member from inside the cylinder body.

In this case, the covering member can be friction stir welded to the cylinder body from outside the cylinder body, while the covering member is pressed from inside the cylinder body. In such a way, interference between a mechanism used for pressing the covering member and that used for performing friction stir welding need not be taken into consideration.

An end position of a friction stir welding process, in which the covering member is friction stir welded to the cylinder body, may be displaced from a connection boundary between the cylinder body and the covering member. In this case, when the covering member is friction stir welded to the cylinder body, the end position of the friction stir welding process where an impression of a welding tool remains can be displaced from the connection boundary between the cylinder body and the covering member, which ensures that fluid loss through a portion at the end position of the friction stir welding process does not occur, and also ensures that no reduction in strength occurs.

A central hole that is formed in the end position may be located outside an inner diameter portion of the bore. In this case, the central hole that is formed at the end position by the welding tool when the covering member is friction stir welded to the cylinder body can be located outside the inner diameter portion of the bore. Therefore, any fluid loss through the central hole and reduction in strength can be prevented.

The end position may be located at a position on a line extending in a direction tangential to the bore. In this case, any unnecessary movement of the tool can be avoided. Therefore, a time required for the friction stir welding process can be reduced.

The cylinder may comprise two bores that are disposed in parallel, wherein separate covering members are friction stir welded to the cylinder body to separately cover respective bores, and wherein end positions of friction stir welding processes, in which the covering members are friction stir welded to the cylinder body, substantially overlap each other. In this manner, the end positions are located at a single site. Therefore, an outer appearance can be improved. At the same time, fluid loss through a portion at the end position of the friction stir welding processes can be prevented, and a reduction in strength does not occur.

Each of the end positions may be located at a position on a line extending in a direction tangential to the respective bores. In this way, any unnecessary movement of a tool can be avoided. Therefore, a time required for the friction stir welding process can be reduced.

The bores may be disposed in an opposing relation to each other; the opposing bores communicate with each other through a communication passage; and an end position of the friction stir welding process, in which the covering member is friction stir welded to the cylinder body, is disposed at such a position that an opening of the communication passage is closed. In this way, the communication passage can be closed by way of friction stir welding. This eliminates the need for closing the communication passage by a separate component. Therefore, the costs of both parts and assembly can be reduced. Further, precision required when such a closure component is connected to the opening of the communication passage is not necessary, which further reduces processing costs.

BRIEF DESCRIPTION OF THE DRAWINGS

FIG. 8 is a rear view of a caliper of a disk brake according to a second embodiment of the present invention.

FIG. 9 is a plan sectional view of a caliper body main part of a disk brake according to a third embodiment of the present invention.

DETAILED DESCRIPTION OF THE INVENTION

Below, the first embodiment of the present invention will be described in detail with reference to FIGS. 1 to 7.

Figure 1:
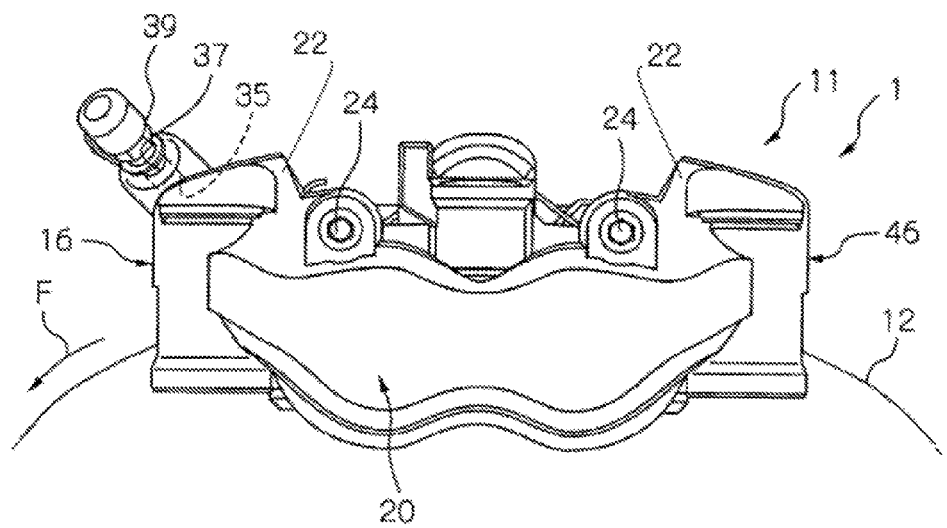
FIG. 1 is a front view of a disk brake according to a first embodiment of the present invention.

As an example of a cylinder apparatus, FIG. 1 shows a disk brake (a cylinder apparatus) 1 for a two-wheeled vehicle according to the first embodiment. The disk brake 1 has an opposed-piston caliper 11, shown in FIGS. 1 to 3, which comprises: a caliper body 16 attached to a non-rotatable portion of the vehicle so as to straddle the disk; and multiple pairs, specifically, two pairs of pistons 17 (in the cross sectional view of FIG. 3, only one pair of pistons 17 are shown), each pair of the pistons 17 being slidably disposed in the caliper body 16 such that the pistons 17 face each other through the disk 12. The description below is based on an installation state in which the disk brake 1 is installed in the vehicle, such that a radial direction of the disk 12 in the installation state is referred to as a disk radial direction; an axial direction of the disk 12 is referred to as a disk axial direction; and a circumferential direction of the disk 12 is referred to as a disk circumferential direction. It should be noted that arrow F in FIG. 1 indicates a rotational direction of the disk 12 when the vehicle is moving forward.

Figure 2:
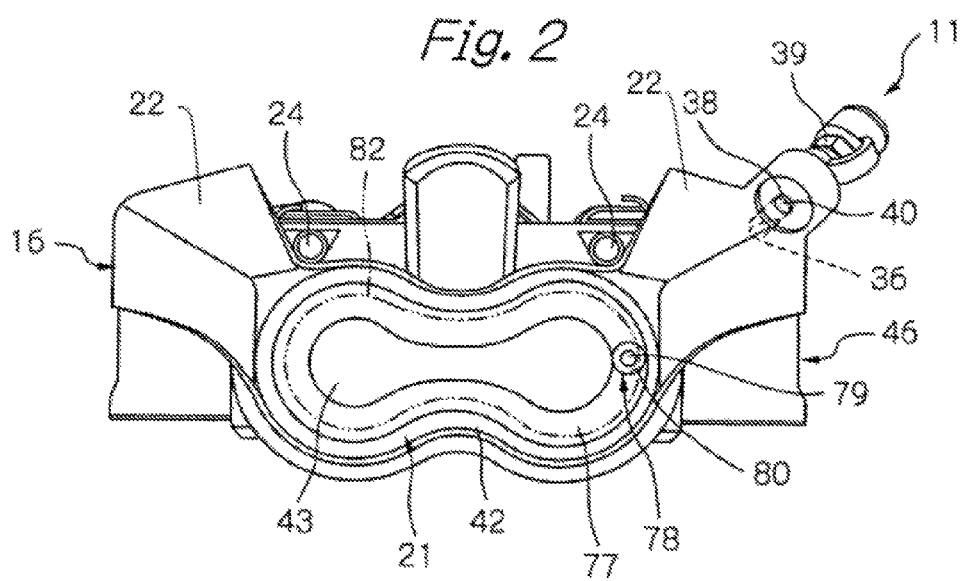
FIG. 2 is a rear view of a caliper of the disk brake according to the first embodiment of the present invention.
Figure 3:
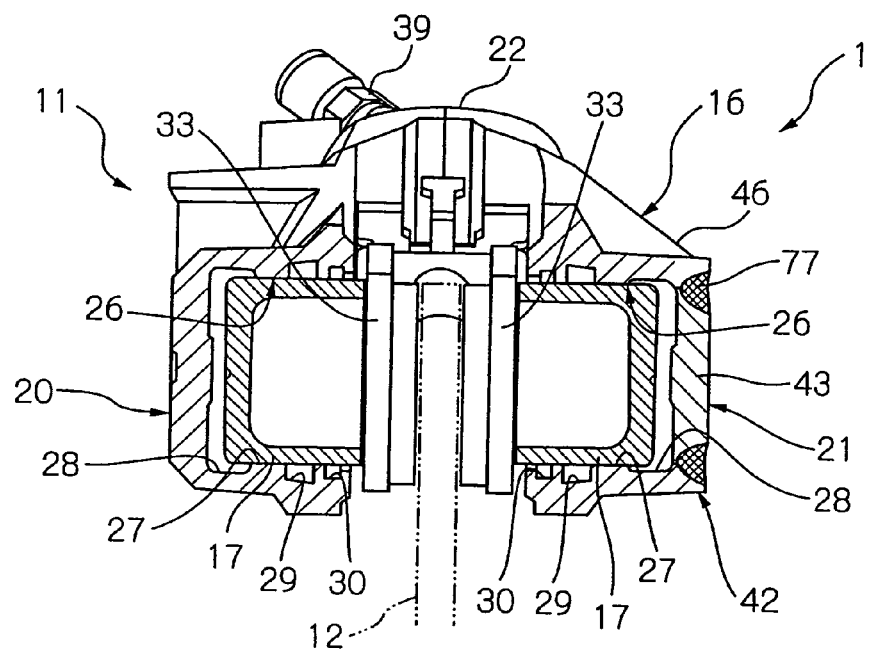
FIG. 3 is a sectional side elevation view of the caliper of the disk brake according to the first embodiment of the present invention.

As shown in FIGS. 1 to 3, the caliper body 16 comprises: an outer cylinder portion 20 disposed on an outer side of the disk 12 (an opposite side of the disk 12 from a vehicle wheel); an inner cylinder portion (cylinder) 21 disposed on an inner side of the disk 12 (a vehicle-wheel side); and a disk pass portion 22 disposed on an outer radial side of the disk 12 so as to connect the outer cylinder portion 20 and the inner cylinder portion 21.

The caliper body 16 is provided with a plurality of, specifically, two pad pins 24 that are disposed apart from each other in the disk circumferential direction and are oriented in the disk axial direction so as to bridge the outer cylinder portion 20 and the inner cylinder portion 21.

The outer cylinder portion 20 and the inner cylinder portion 21 have multiple pairs, specifically, two pairs of bores 26 that are separated from each other in the disk circumferential direction, the bores 26 of each pair being oriented in the disk axial direction to oppose each other. Into the bores 26 are fitted the above-mentioned pistons 17. In this manner, the multiple, specifically, two pairs of bores 26 are formed parallel to each other in the disk circumferential direction, the bores 26 of each pair being oriented in the disk axial direction so as to oppose each other. Correspondingly, the multiple, specifically, two pairs of pistons 17 are disposed parallel to each other in the disk circumferential direction, the pistons 17 of each pair being oriented in the disk axial direction so as to oppose each other.

As shown in FIG. 3, each of the bores 26 comprises: a fitting internal diameter portion 27 which fittingly holds the piston 17, such that the pistons 17 are capable of slidably moving therein; and an enlarged internal diameter portion 28 which is located behind the fitting internal diameter portion 27 and has a diameter larger than the fitting internal diameter portion 27. In axially intermediate portions of the fitting internal diameter portion 27 are formed a plurality of, specifically, two circumferential seal grooves 29 and 30 for holding piston seals (not shown).

Each pad pin 24 of the caliper body 16 supports a pair of brake pads 33; therefore, two pairs of brake pads 33 in total (in the cross sectional view of FIG. 3, only one pair of brake pads 33 are shown) are supported by the pad pins 24 to be capable of moving in the disk axial direction. The brake pads 33 are disposed on axially opposing sides of the disk 12, and the pistons 17 are provided in the caliper body 16, such that the pistons 17 are located on sides of the respective brake pads 33 opposite from the disk 12. In this manner, the brake pads 33 can be pressed against the disk 12 by means of the pistons 17 in the caliper body 16 to thereby apply a braking force to the vehicle. In the caliper body 16 are formed passages for introducing a brake fluid into the bores 26 to thereby operate the pistons 17. Of the passages, the communication passages 35 and 36, which communicate between the opposing bores 26, are formed from outside the caliper body 16 so as to intersect each other in the caliper body 16. The communication passage 35 has a bleeder plug 39 for air removal that is attached at an opening 37 that opens to the outside. The opening 38 of the communication passage 36 that opens outside is closed by a closure plug 40.

In the first embodiment, the above-mentioned outer cylinder portion 20, inner cylinder portion 21, and disk pass portion 22 of the caliper body 16 are formed integrally from a one-piece aluminum cast or the like, except for a bottom portion of either the outer cylinder portion 20 or the inner cylinder portion 21, specifically, a bottom portion 42 of the inner cylinder portion 21. A part of the bottom portion 42 of the inner cylinder portion 21 is formed as a separate body referred to as a covering member 43.

Figure 4:
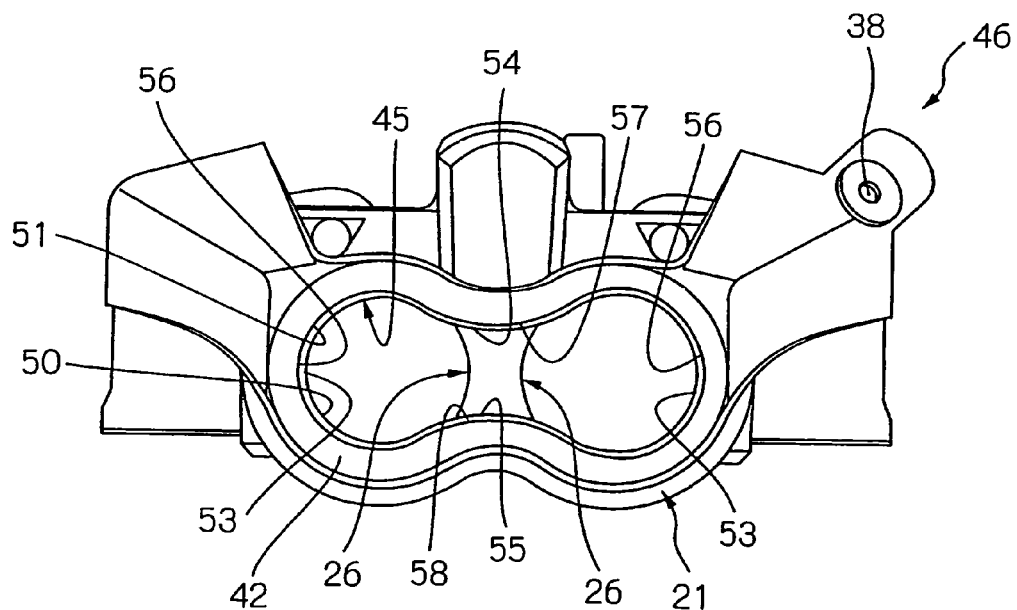
FIG. 4 is a rear view of a caliper body main part of the disk brake according to the first embodiment of the present invention.
Figure 5:
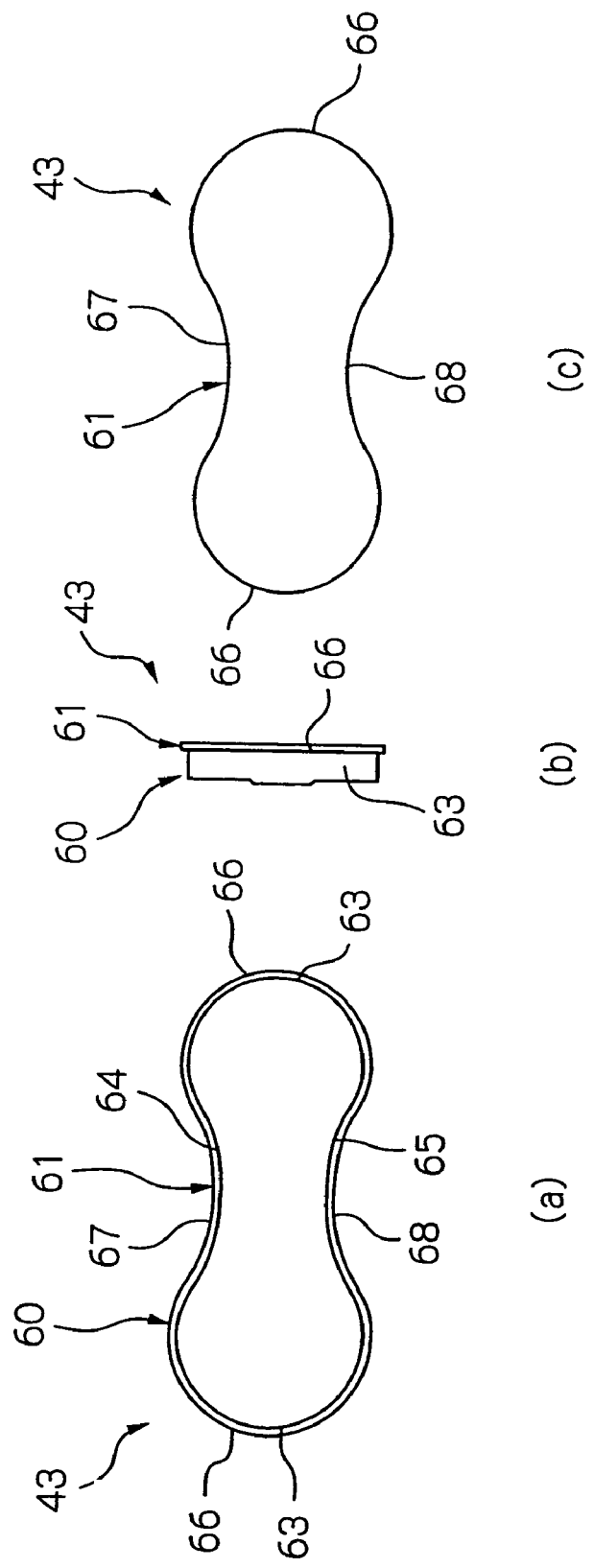
FIG. 5 is a front view (a), a side view (b), and a rear view (c) of a covering member of the disk brake according to the first embodiment of the present invention.

In other words, as shown in FIG. 4, the caliper body 16, which includes the outer cylinder portion 20, the inner cylinder portion 21, and the disk pass portion 22, comprises: an integral caliper body main part (a cylinder body) 46 having an opening 45 formed in the bottom portion 42 of the inner cylinder portion 21, the opening 45 communicating with each of the bores 26; and a covering member 43 as shown in FIG. 5 provided to close the opening 45 of the main part 46, the covering member 43 being made of the same material as the main part 46 but being made as a body separate from the main part 46. That is, the inner cylinder portion 21 of the caliper body 16 comprises the covering member 43 of the bottom portion 42 and the opening 45 that is closed by the covering member 43 and is, together with the outer cylinder portion 20, integrated in the main part 46.

As shown in FIG. 4, the opening 45 of the main part 46 is formed to extend over both of the bores 26 on the inner side of the disk, the bores 26 being aligned in the disk axial direction and being placed side by side in the disk circumferential direction. The opening comprises a main open portion 50 and a stepped portion 51 that is formed along an entire periphery of the main open portion 50 on an opposite side of the main open portion 50 from the bores 26, the stepped portion 51 being slightly larger in circumference than the main open portion 50.

Specifically, the main open portion 50 is shaped to have: a pair of arc-shaped lateral inner circumferential portions 53 that are coaxial with the respective bores 26, are smaller in diameter than the enlarged inner diameter portions 28 of the bores 26, and are located on mutually remote sides of the bores 26; and a connecting inner circumferential portion 54 connecting mutually proximate portions, on an outer disk radial side, of the lateral inner circumferential portions 53, the connecting inner circumferential portion 54 being shaped in an arc of a circle whose center is positioned outward of the lateral inner circumferential portions 53 in the radial direction; and a connecting inner circumferential portion 55 connecting mutually proximate portions, on an inner disk radial side, of the lateral inner circumferential portions 53, the connecting inner circumferential portion 55 forming an arc of a circle, the center of which is located inward of the lateral inner circumferential portions 53 in the radial direction.

The stepped portion 51 also comprises: a pair of lateral inner circumferential portions 56 formed on the respective outer sides of the pair of arc-shaped lateral inner circumferential portions 53; a connecting inner circumferential portion 57 formed on the outer disk radial side of the connecting inner circumferential portion 54 so as to connect mutually proximate portions, on the outer disk radial side, of the lateral inner circumferential portions 56; and a connecting inner circumferential portion 58 formed on the inner disk radial side of the connecting inner circumferential portion 55 so as to connect mutually proximate portions, on the inner disk radial side, of the pair of lateral inner circumferential portions 56.

The covering member 43 in FIG. 5 is made of an aluminum plate or the like and has an outer circumferential portion that comprises: a main circumferential portion 60 having a shape substantially the same as the above-mentioned main open portion 50 so as to be fitted into the main open portion 50; and a flange 61 formed along an entire periphery of the main outer circumferential portion 60 on one side of the main outer circumferential portion 60 in the direction of plate thickness, the flange 61 having a shape substantially the same as the stepped portion 51 so as to be fitted into the stepped portion 51.

Specifically, the main outer circumferential portion 60 comprises: a pair of lateral outer circumferential portions 63 that are adapted to be attached to the pair of lateral inner circumferential portions 53 of the above-mentioned main open portion 50 formed on mutually remote sides of the main open portion 50; a connecting outer circumferential portion 64 that connects the pair of lateral outer circumferential portions 63 on the outer disk radial side and is adapted to be attached to the connecting inner circumferential portion 54 of the main open portion 50; and a connecting outer circumferential portion 65 that connects the pair of lateral outer circumferential portions 63 on the inner disk radial side and is adapted to be attached to the connecting inner circumferential portion 55 of the above-mentioned main open portion 50.

The flange 61 also comprises: a pair of lateral outer circumferential portions 66 that are formed on outer sides of the pair of arc-shaped lateral outer circumferential portions 63 and are adapted to be attached to the pair of lateral inner circumferential portions 56 of the above-mentioned stepped portion 51; a connecting outer circumferential portion 67 that connects the pair of lateral outer circumferential portions 66 on the outer disk radial side of the connecting outer circumferential portion 64 and that is adapted to be attached to the connecting inner circumferential portion 57 of the above-mentioned stepped portion 51; and a connecting outer circumferential portion 68 that connects the pair of lateral outer circumferential portions 66 on the inner disk radial side of the connecting outer circumferential portion 65 and that is adapted to be attached to the connecting inner circumferential portion 58 of the above-mentioned stepped portion 51.

Next, fitting inner diameter portions 27, circumferential seal grooves 29 and 30, etc. for example, are formed in the inner cylinder portion 21 and the outer cylinder portion of the main part 46, which also includes the disk pass portion 22, using a cutting tool that is inserted from the outside through the opening 45 of the inner cylinder portion 21 or a pilot hole of the opening 45 of the inner cylinder portion 21, the pilot hole being formed during casting. In the case that the opening 45 is a pilot hole, the opening 45 is formed by the cutting tool at this stage, together with formation of the fitting inner diameter portion 27, the circumferential seal grooves 29 and 30, and so on. It is to be noted that the opening 45 can be formed during a casting stage.

Figure 6:
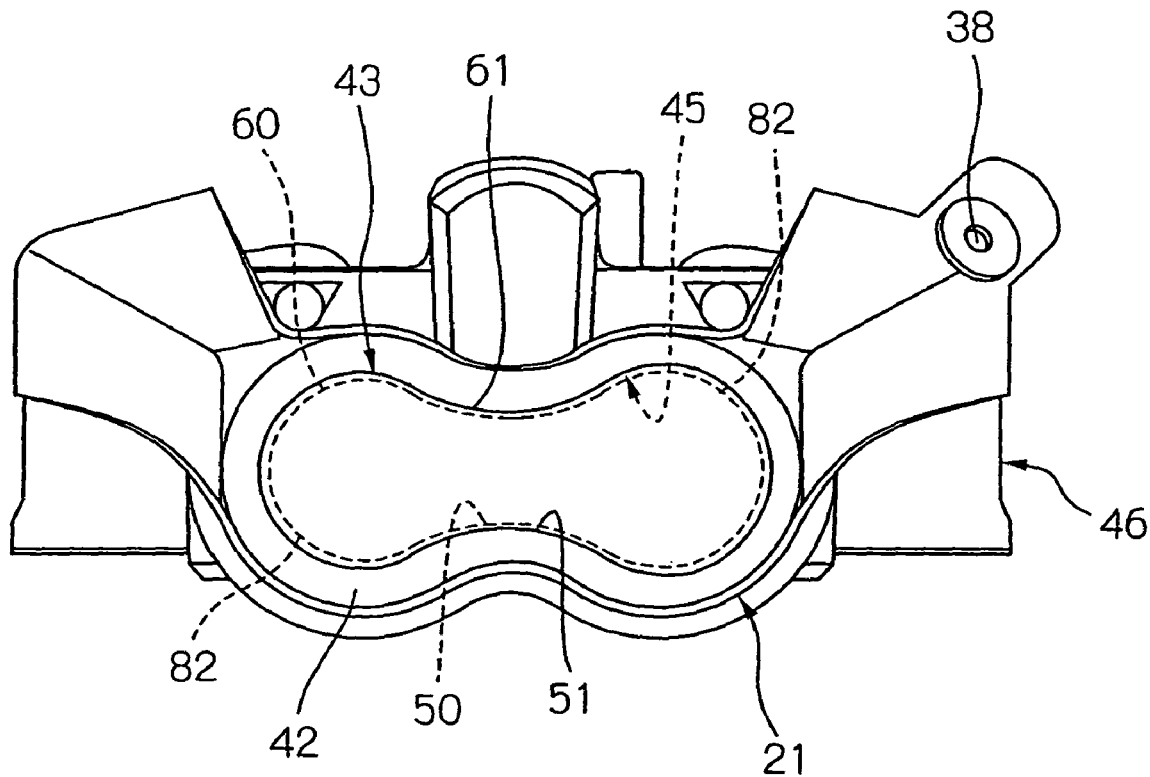
FIG. 6 is a rear view showing a state where the covering member is fitted into the caliper body main part of the disk brake according to the first embodiment of the present invention.

Then, as shown in FIG. 6, the covering member 43 comprising the main outer circumferential portion 60 and the flange 61 is fitted, from outside the main body 46, into the main part 46 formed as described above. Specifically, the main outer circumferential portion 60 of the covering member 43 shown in FIG. 5 is fitted into the main open portion 50 of the opening 45 of the main part 46 shown in FIG. 4, while the flange 61 of the covering member 43 shown in FIG. 5 is fitted into the stepped portion 51 of the main part 46 shown in FIG. 4. In this way, an outer surface of a surrounding portion of the opening 45 of the inner cylinder portion 21 of the main part 46 becomes substantially level with an outer surface of the covering portion 43.

Figure 7:
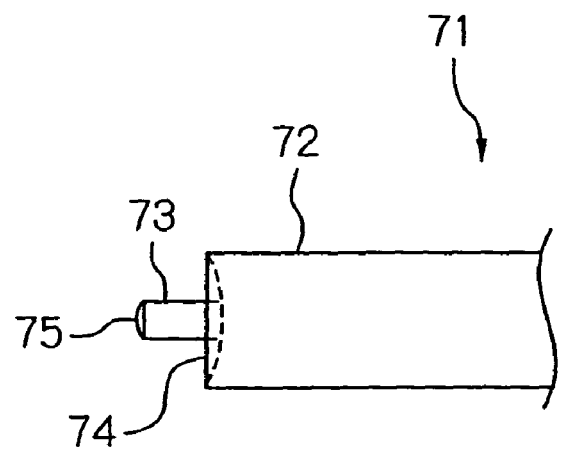
FIG. 7 is a side view of a welding tool used when the covering member is friction stir welded to the caliper body main part of the disk brake according to the first embodiment of the present invention.

At this stage, while the covering member 43 is pressed, from outside the main part 46 against the main part 46 so as to prevent any movement of the covering member 43 relative to the main part 46, the covering member 43 is attached to the main part 46 by means of friction stir welding (FSW) that is performed from outside the main part 46. As shown in FIG. 7, a welding tool 71 used to carry out the friction stir welding has a cylindrical large-diameter shaft portion 72 and a cylindrical tip shaft portion 73 that is smaller in diameter than and coaxial with the large-diameter shaft portion 72. The large-diameter portion 72 has an arc-shaped depression 74 formed on a tip side thereof. From the center of the depression 74 stands the tip shaft portion 73. The tip shaft portion 73 has a tip 75 that is spherical. It is to be noted that with regard to a detailed method of friction stir welding using the above-mentioned welding tool 71, reference is made to, for example, FIGS. 12 A to C of U.S. Pat. No. 5,460,317.

During friction stir welding, the welding tool 71 is continuously operated to move the tip shaft portion 73 thereof along a connection boundary 82 between the main outer circumferential portion 60 of the covering member 43 and the main open portion 50 of the opening 45, which are attached to each other. After performing friction stir welding along the entire periphery of the covering portion 43, the welding tool 71 is removed. In this way, as shown in FIG. 2, friction stir welding is effected at a width substantially equal to the diameter of the large-diameter shaft portion 72 so as to form a connecting portion 77 in the form of a closed loop. Further, a residual impression 78 of a shape substantially the same as the welding tool 71 is left only at a position where the welding tool 71 is removed to complete the friction stir welding process. Specifically, a central hole 79 of a shape substantially the same as the tip shaft portion 73 of the welding tool 71 and a surrounding depression 80 of a shape substantially the same as the large-diameter shaft portion 72 remain at the end position of the friction stir welding process. The bottom portion 42 of the inner cylinder portion 21 has a predetermined thickness, etc. so as to prevent the central hole 79 and the surrounding depression 80 of the residual impression 78 from penetrating any of the bores 26.

According to the first embodiment described above, the covering member 43 in the bottom portion 42 of the inner cylinder portion 21 is friction stir welded to the main part 46. This makes it possible to hermetically integrate the covering member 43 with the main part 46 and, therefore, eliminates the need for forming threads on the covering member 43 and the main part 46, a seal groove, a hexagonal socket for engagement with the connecting tool, and the like. As a result, processing costs can be reduced, and the apparatus can be reduced in size. Further, this also eliminates the need for a seal ring; therefore, the parts' cost can be reduced, and fluid leakage associated with degradation of the seal ring due to aging is avoided. Further, compared to a structure in which separate component parts are employed, use of an integral structure formed by the covering member 43 and the main part 46 enables a hermetic sealing state to be reliably maintained, which further ensures that there is no fluid leakage. In addition, the integration of the covering member 43 and the main part 46 enables a number of parts used to be reduced, resulting in correspondingly lower management costs.

The covering member 43 is friction stir welded to the caliper body 46, such that the covering member 43 covers the opening 45 from outside the caliper body 46. In this manner, the covering member 43 can be pressed against the caliper body 46 from outside the caliper body 46, while friction stir welding is performed from outside the caliper body 46. Therefore, the pressing of the covering member 43 against the caliper body 46 can be made easier because it can be pressed from outside the caliper body 46.

In addition, the shape of the covering member 43 can be simplified, thereby avoiding any increase in costs associated with manufacturing the covering member 43.

Further, the covering member 43 can be set on the main part 46 after the main part 46 is fixed to a jig; this makes it possible to securely hold the main part 46, which is subject to a reaction force during friction stir welding.

Further, the covering member 43 is friction stir welded to the main part 46, such that the single covering member 43 covers, from outside the main part 46, the single opening 45, which is shaped to extend over both of the bores 26 aligned in the disk axial direction and arranged in parallel. Therefore, only one covering member 43 is required to close the opening 45, even in the case that a plurality of bores 26 are arranged in parallel to each other.

Below, the second embodiment of the present invention is described mainly with reference to FIG. 8, focusing on differences from the first embodiment. It should be noted that elements in this embodiment that correspond to ones described in the first embodiment are designated by the same reference numerals, and descriptions thereof are omitted.

As shown in FIG. 8, in the second embodiment, when the covering member 43 is friction stir welded to the main part 46, the end position of the friction stir welding process where an impression of the welding tool 71 is left is located at a bulge portion of the outer circumferential portion and displaced from the connection boundary 82 between the main open portion 50 and the main outer circumferential portion 60 where the main part 46 and the covering member 43 are in abutting contact with each other. In other words, the above-mentioned residual impression 78 is displaced from the connection boundary 82 between the main part 46 and the covering member 43. Specifically, the connecting portion 77, which is formed by friction stir welding in a closed loop, extends farther outward in a direction tangential to the bore 26, that is, toward the main part 46 to thereby form an extending portion 84, and the residual impression 78 that is located at an outside position that does not overlap with the closed-loop connecting portion 77 of the main part 46. It should be noted that the residual impression 78 is formed at a position that does not overlap with the bore 26 when viewed in the disk axial direction.

In the second embodiment, as described above, the residual impression 78 is displaced from the connection boundary 82 where the main part 46 and the covering member 43 are in abutting contact with each other. Therefore, fluid leakage through a friction stir welded portion can be reliably prevented. Particularly, fluid leakage can be prevented more reliably by displacing the residual impression 78 outside the enlarged inner diameter portion 28 of the bore 26. In other words, by displacing the central hole 79 of the residual impression 78 outside an inner diameter portion of the bore 26 (the enlarged inner diameter portion 28 in the case that the enlarged inner diameter portion 28 is provided as in the present embodiment; otherwise, the fitting inner diameter portion 27) and thereby creating a distance of separation between the central hole 79 and the bore 26, communication between the central hole 79 and the bore 26 can be prevented. As a result, fluid leakage can be prevented more reliably.

Further, the end position is located at a position on a line extending in a direction tangential to the bore 26. Therefore, unnecessary movement of the welding tool 71 can be avoided, and a time required for the friction stir welding process reduced. In addition, only one additional movement of the welding tool 71 relative to the main part 46 is required (in a tangential direction), with the result that the structure of a friction stir welding apparatus can be kept simple.

Below, the third embodiment of the present invention is described mainly with reference to FIGS. 9 to 12, focusing on differences from the first embodiment. It should be noted that elements in this embodiment that correspond to ones described in the first embodiment are designated by the same reference numerals, and descriptions thereof are omitted.

Figure 10:
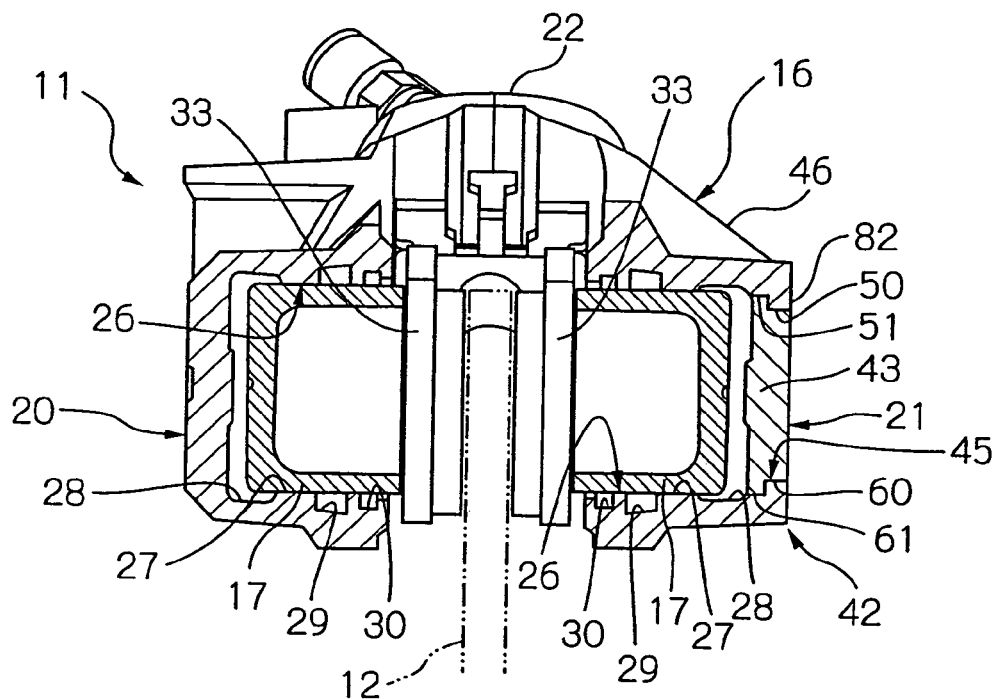
FIG. 10 is a sectional side elevation view showing a state where the covering member is fitted into the caliper body main part of the disk brake according to the third embodiment of the present invention.

In the third embodiment, as shown in FIGS. 9 and 10, the opening 45, which is provided in the bottom portion 42 of the inner cylinder portion 21 of the main part 46, is formed individually in a circular shape for each of the bores 26 disposed in the disk circumferential direction. Correspondingly, the covering member 43 is also formed in a circular shape and is provided for each opening 45. In the third embodiment, the covering member 43 is fitted into the openings 45 from inside the main part 46, that is, from a side of the bore 26; however, it is also possible to fit the covering members 43 from outside the main part 46, as in the first embodiment.

Each opening 45 has a main open portion 50 of a circular shape with a diameter smaller than that of the fitting inner diameter portion 27 of the bore 26. The stepped portion 51 is formed on a side of the bore 26 relative to the main open portion 50, and is circularly shaped with a diameter larger than that of the main open portion 50 and smaller than that of the fitting inner circular portion 27. Each covering member 43 has: a main outer circumferential portion 60 of a circular shape with a diameter substantially equal to that of the above-mentioned main open portion 50, the main outer circumferential portion 60 being fitted into the main open portion 50; and a flange 61 of a circular shape with a diameter substantially equal to that of the above-mentioned stepped portion 51, flange 61 being fitted into the stepped portion 51.

Formation of the main part 46 is performed through each opening 45 or a pilot hole of the opening 45 in the same manner as in the first embodiment. Then, as shown in FIG. 10, the covering member 43 having the main outer circumferential portion 60 and flange 61 is fitted into each opening 45 from inside the main part 46. In other words, the main outer circumferential portion 60 of each covering member 43 is fitted into the main open portion 50 of the opening 45 of the main part 46, while the flange 61 of each covering member 43 is fitted into the stepped portion 51 of the main part 46. In this way, the outer surface of the surrounding portion of the opening 45 of the inner cylinder portion 21 of the main part 46 becomes substantially level with the outer surface of the covering member 43.

Figure 11:
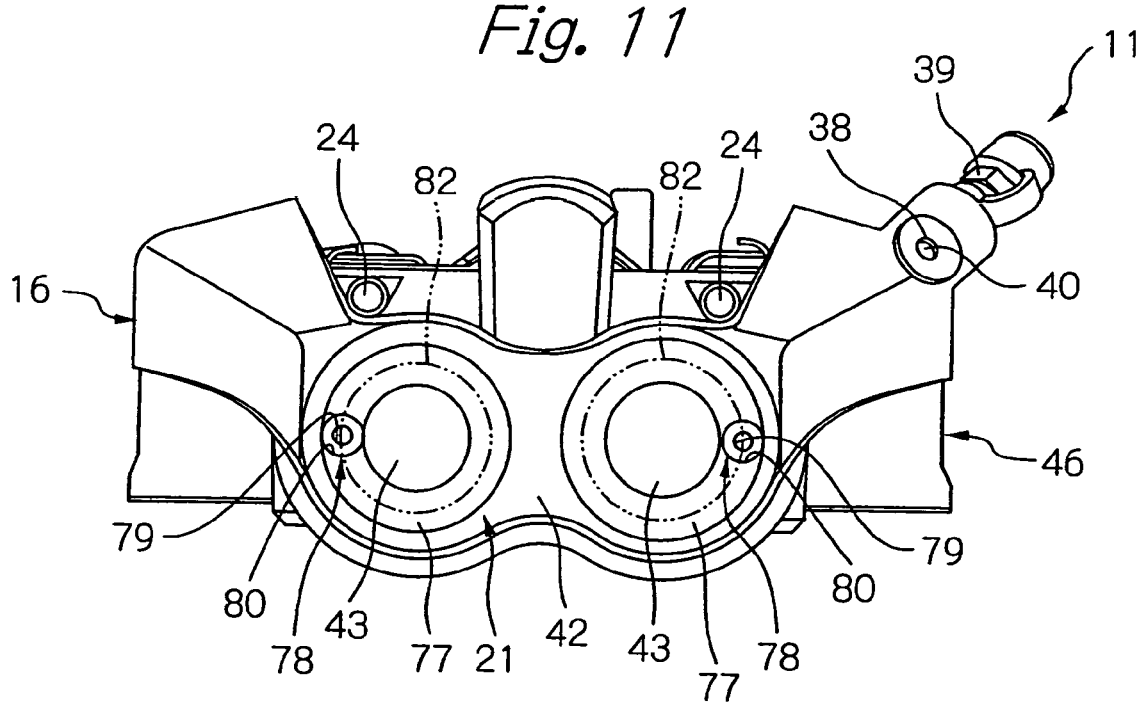
FIG. 11 is a rear view of the caliper of the disk brake according to the third embodiment of the present invention.
Figure 12:
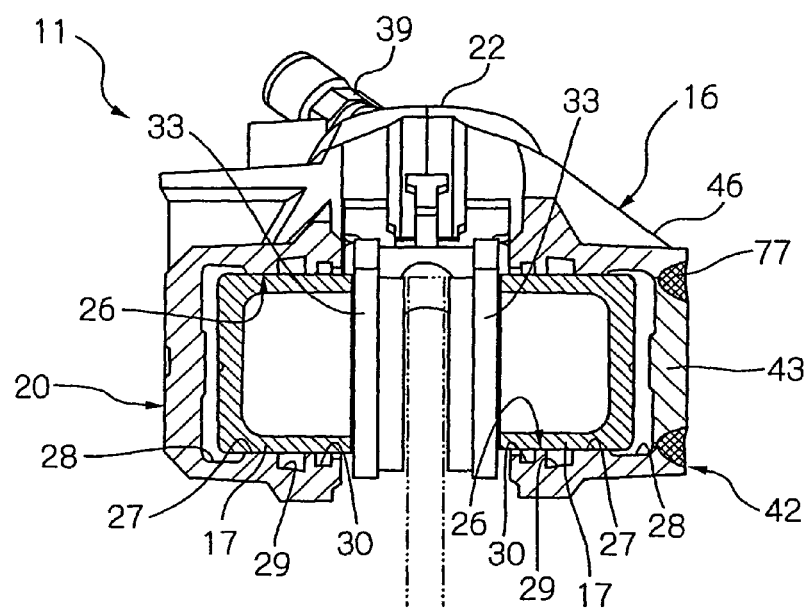
FIG. 12 is a sectional side elevation view of the caliper of the disk brake according to the third embodiment of the present invention.
Figure 13:
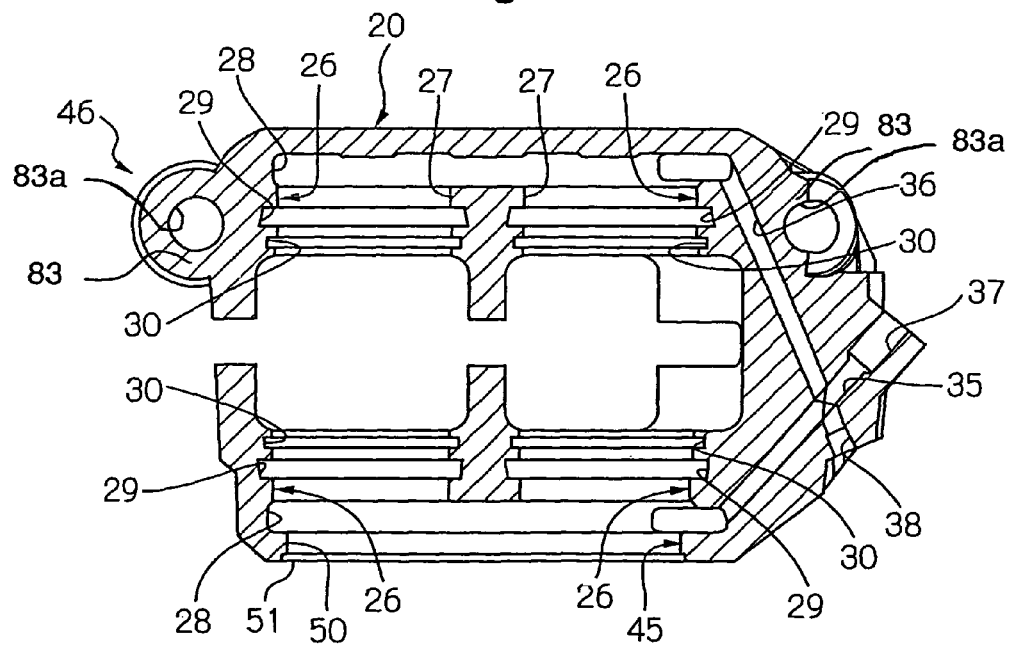
FIG. 13 is a plan sectional view of a caliper body main part of a disk brake according to a fourth embodiment of the present invention.
Figure 14:
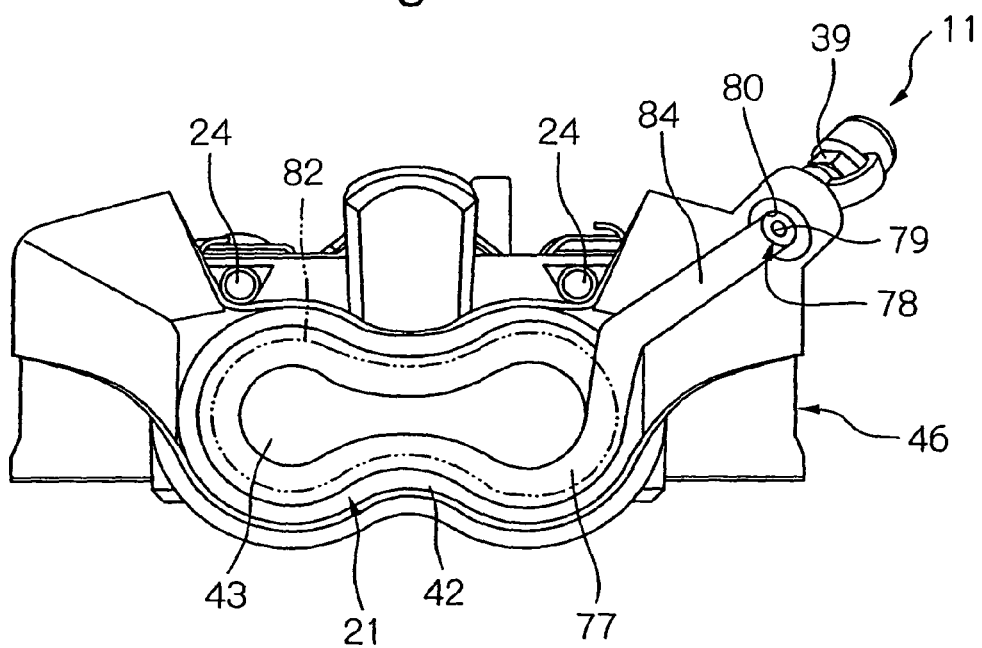
FIG. 14 is a rear view of the caliper of the disk brake according to the fourth embodiment of the present invention.

At this stage, while the covering member 43 is pressed against the main part 46 from the side of bore 26 so as to prevent any movement of the covering member 43 relative to the main part 46, using a holding mechanism (not shown), the covering member 43 is attached to the main part 46 by means of friction stir welding performed from outside the main part 46. Specifically, the tip shaft portion 73 of the welding tool 71 is positioned in the vicinity of the connection boundary 82 where the main outer circumferential portion 60 of the covering member 43 and the main open portion 50 of the opening 45 are in abutting contact, and is moved along the connection boundary 82. Then, after performing friction stir welding along the entire periphery of the covering portion 43, the welding tool 71 is removed. Such friction stir welding is performed for each covering member 43. In this way, friction stir welding is effected at a width substantially equal to the diameter of the large-diameter shaft portion 72 of the welding tool 71 with the result that, as shown in FIGS. 11 and 12, the closed-loop connecting portions 77 are formed such that the residual impressions 78 each having the central hole 79 and the surrounding depression 80 are left only at positions where the welding tool 71 is removed to complete the friction stir welding processes. In this case also, the bottom portion 42 of the inner cylinder portion 21 has a predetermined thickness, etc. so as to prevent the central holes 79 and the surrounding depressions 80 of the residual impressions 78 from penetrating any of the bores 26.

According to the third embodiment described above, the covering member 43 is friction stir welded to the main part 46 with the opening 45 being closed by the covering member 43 from inside the main part 46. This enables friction stir welding of the covering member 43 from outside the main part 46, while the covering member 43 is pressed against the main part 46 from inside the main part 46. In such a way, interference between a mechanism used for pressing the covering member 43 and that used for performing friction stir welding need not be taken into consideration. Further, since there is no possibility of the covering member 43 falling off outward of the main part 46, a strength of the main part 46 can be maintained. Further, in the third embodiment, as shown in FIG. 9, the main part 46 (caliper 11) is provided with a pair of vehicle mounting portions 83 that each have a mounting hole 83a through which a mounting bolt (not shown) is inserted so as to radially mount the main part 46 onto the non-rotatable portion of the vehicle. The pair of mounting holes 83a extend in a radial direction, that is, in the direction perpendicular to the drawing. The bores 26, located on a side on which the vehicle mounting portions 83 are mounted, are distorted due to a force applied when the mounting bolts are tightened so as to mount the main part 46 to the non-rotatable portion of the vehicle. Meanwhile, the bores 26, which have been friction stir welded as described above, are located on a side of the disk (not shown) opposite from the vehicle mounting portions 83. These friction stir welded bores 26 are distorted due to heating during stir friction welding. Since the bores 26 on the side of the vehicle mounting portions 83 and the friction stir welded bores 26 are located on opposite sides from each other, each of the bores 26 suffers only either a distortion due to the force applied to mount the main part 46 or a distortion due to heating. Therefore, obstruction of sliding movement of the pistons 17 within the bores 26 is less likely to occur than would be if the bores 26 suffered both of the above-mentioned distortions and were thus more distorted.

In the third embodiment also, although not shown, it is possible, as in the second embodiment, to displace the positions of the residual impressions 78, that is, end positions of the friction stir welding processes where impressions of the welding tool 71 are left, from the connection boundary 82 between the main open portion 50 of the main part 46 and the main outer circumferential portion 60 of the covering member 43, when the covering member 43 is friction stir welded to the main part 46. As described above, in the case that each covering member 43 is fitted into the opening 45 from outside the caliper body 46, as in the first embodiment, the positions of the main open portion 50 and the stepped portion 51 of the main part 46 as well as the positions of the main outer circumferential portion 60 and the flange 61 of the covering member 43, as shown in FIG. 10, should be reversed to dispose the main open portion 50 and the main outer circumferential portion 60 inside and the stepped portion 51 and flange 61 outside. Further, without forming the stepped portion 51 and the flange 61, the main part 46 can be formed to have the main open portion 50 with a uniform diameter; correspondingly, the covering portion 43 can be formed to have the main outer circumferential portion 60 with a uniform diameter so as to be capable of fitting the outer circumferential portion 60 into the main open portion 50.

Below, the fourth embodiment of the present invention is described mainly with reference to FIGS. 13 to 16, focusing on differences from the second embodiment. It should be noted that elements in this embodiment that correspond to ones described in the first embodiment are designated by the same reference numerals, and descriptions thereof are omitted.

In the main part 46, the two communication passages 35 and 36 for communication between the opposing bores 26 are formed by drilling from outside the main part 46 in such a manner that the communication passages 35 and 36 intersect in the caliper body 16. The above-mentioned bleeder plug 39 for removal of air is attached to the opening 37 of the communication passage 35 that is open to the outside.

In the fourth embodiment, the opening 38 of the communication passage 36 that is open to the outside is closed by a friction stir welding process, rather than with the closure plug 40. In other words, in the second embodiment, when the covering member 43 is friction stir welded to the main part 46, the end position of the friction stir welding process where the impression of the welding tool 71 remains is displaced from the connection boundary 82 where the main part 46 and the covering member 43 are in abutting contact; while, in the fourth embodiment, the end position of the friction stir welding process is located at a position where the opening 38 of the communication passage 36 is closed by material softening by means of the friction stir welding process.

Figure 15:
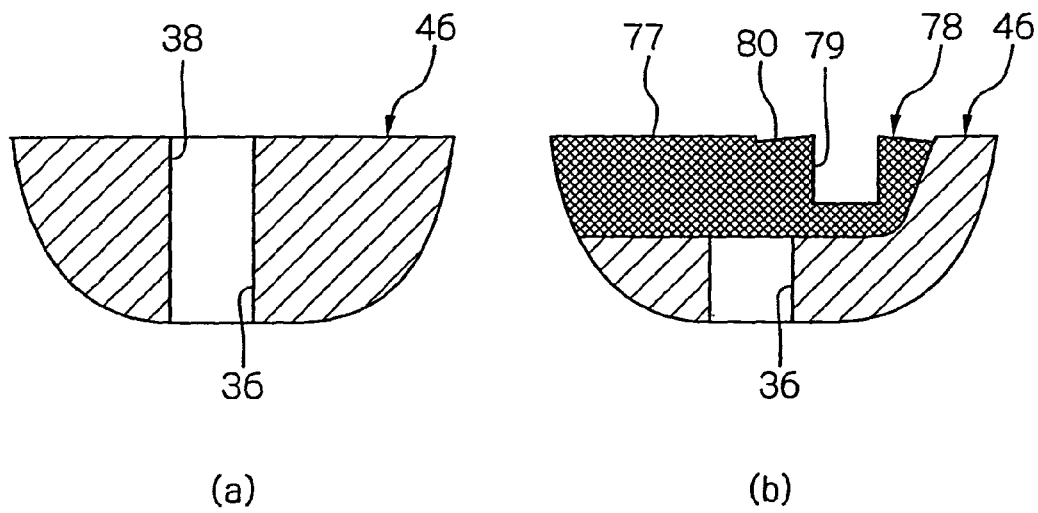
FIG. 15 shows partial enlarged cross sectional views of a communication passage of the caliper body main part of the disk brake according to the fourth embodiment of the present invention as the communication passage appears (a) before being closed and (b) after being closed.

Specifically, the extending portion 84 extends from the closed-loop connecting portion 77 to the opening 38, and, as shown in FIGS. 15 (*a*) and (*b*), the friction stir welding process is completed at a position that exceeds the opening 38 by a certain distance. In doing so, the above-mentioned residual impression 78 remains only at the end position where the welding tool 71 is removed, such that the central hole 79 of the residual impression 78 is separated in a radial direction of the central hole 79 from the communication passage 36 by a predetermined distance.

According to the fourth embodiment described above, when the covering member 43 is friction stir welded to the main part 46, the end position of the friction stir welding process is located at a position where the opening 38 of the communication passage 36, which communicates between the opposing bores 26, is closed. In this way, the communication passage 36 can be closed by means of the friction stir welding process. This eliminates the need for closing the communication passage 36 with a separate plug; and therefore, parts' and assembly costs can be reduced. Further, processing costs can be reduced, because precision required for attaching the closure plug 40 to the opening 38 of the communication passage 36 is not necessary. Further, the degree of freedom in deciding the position of attaching the bleeder plug 39 and in arranging the communication passages 35 and 36 can be enhanced so as enable the main part 46 to be reduced in size.

Figure 16:
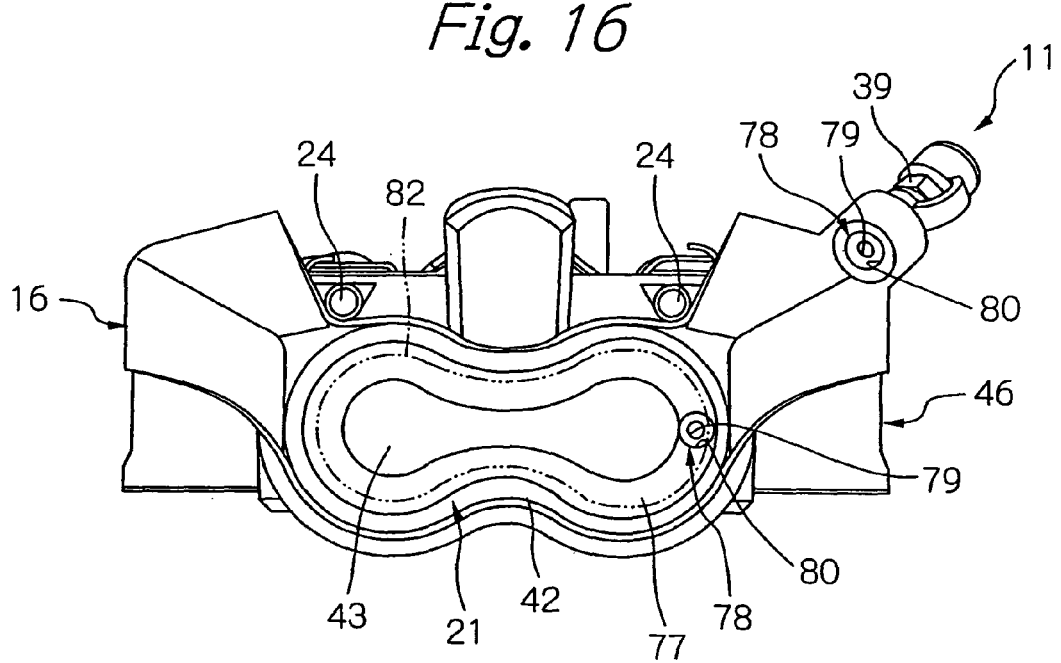
FIG. 16 is a rear view of an example of a modified caliper of the disk brake according to the fourth embodiment of the present invention.

It should be noted that there are alternatives to uninterruptedly extending the friction stir welding process from the connecting portion 77 up to the opening 38 to thereby close the opening 38, as in the fourth embodiment. That is, as shown in FIG. 16, after temporarily stopping the friction stir process at the same end position of the friction stir welding process as in the first embodiment, material softening can be carried out by means of the friction stir welding process starting from a neighboring position of the opening 38 to thereby close the opening 38. Alternatively, after temporarily stopping the friction stir welding process at the same end position of the friction stir welding process as in the second embodiment, material softening can be carried out by means of the friction stir welding process starting from a neighboring position of the opening 38 to thereby close the opening 38. In such a case, precision required for attaching the closure plug 40 to the opening 38 of the communication passage 36 is not necessary. As a result, the processing costs can be reduced. Further, the degrees of freedom in deciding the position of attaching the bleeder plug 39 and in arranging the communication passages 35 and 36 can be enhanced so as to enable the main part 46 to be reduced in size.

Below, the fifth embodiment of the present invention is described mainly with reference to FIGS. 17 to 21, focusing on differences from the first embodiment. It should be noted that elements in this embodiment that correspond to ones described in the first embodiment are designated by the same reference numerals, and descriptions thereof are omitted.

Figure 17:
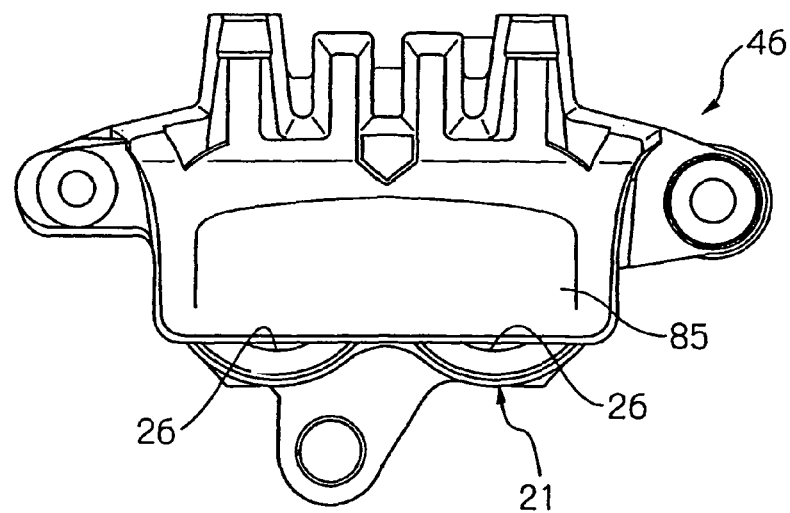
FIG. 17 is a front view of a caliper body of a disk brake according to a fifth embodiment of the present invention.
Figure 18:
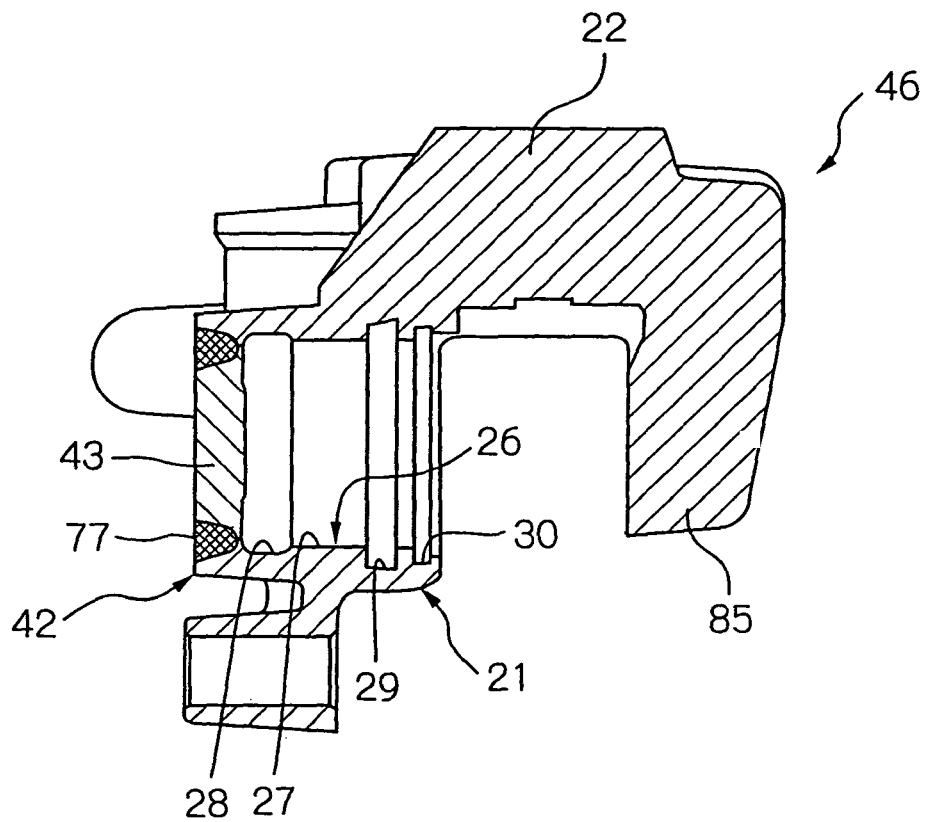
FIG. 18 is a sectional side elevation view of the caliper body of the disk brake according to the fifth embodiment of the present invention.
Figure 19:
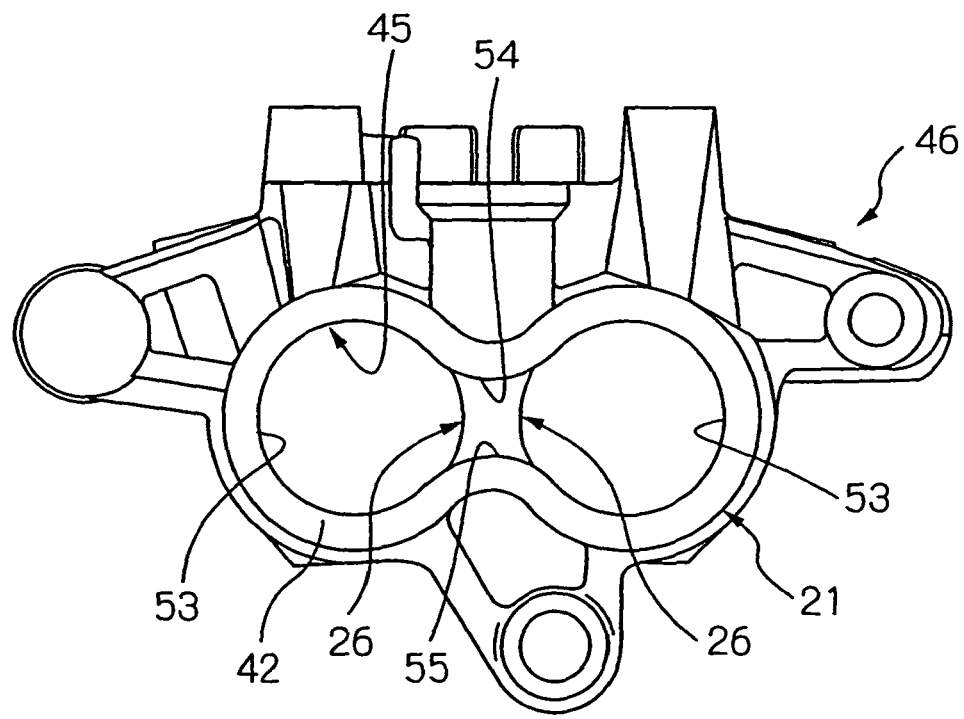
FIG. 19 is a rear view of the caliper body main part of the disk brake according to the fifth embodiment of the present invention.
Figure 20:
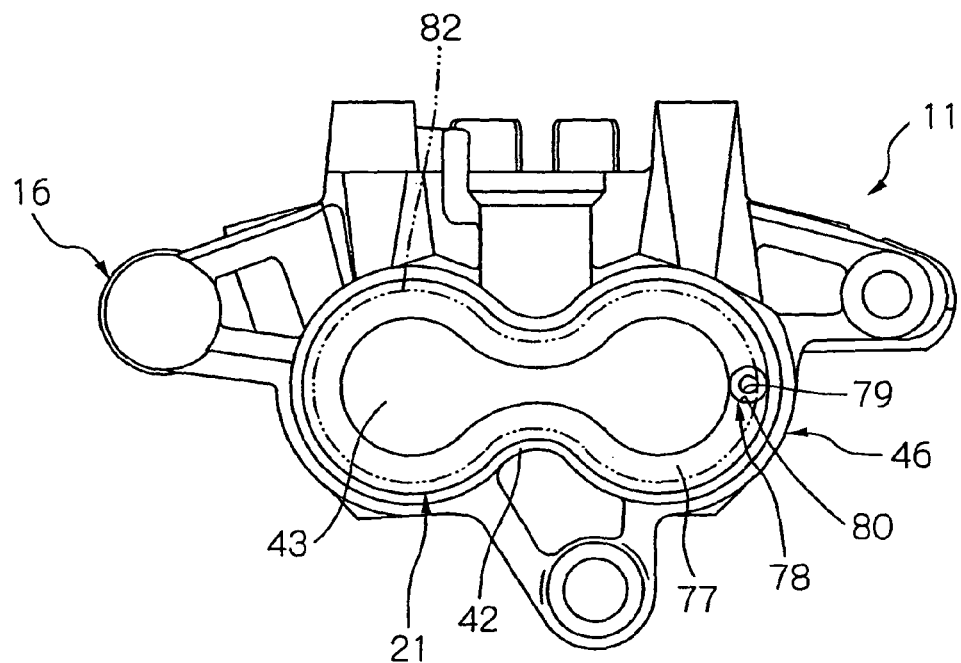
FIG. 20 is a rear view of the caliper body of the disk brake according to the fifth embodiment of the present invention.

In the fifth embodiment, as shown in FIGS. 17 and 18, instead of the outer cylinder portion, an outer claw portion 85 without any piston is provided on the outer side of the caliper body 16. Therefore, as shown in FIG. 19, only in the inner cylinder portion 21 are there provided a plurality of, specifically, two bores 26 that are oriented parallel to the disk axial direction and that are separated from each other in the disk circumferential direction. The caliper body 16 of the fifth embodiment is a floating type that is, while supporting pads 33, slidably supported by a carrier attached to a non-rotatable portion on the inboard side, such that pads 33 are held by the pistons 17 and the outer claw portion 85 so as to be capable of pressing the pads 33 against the disk 12, thereby applying a braking force to a vehicle.

Therefore, the above-mentioned outer claw portion 85, the inner cylinder portion 21, and the disk pass portion 22 of the main part 46 are integrally made of a one-piece material, except for the bottom portion 42 of the inner cylinder portion 21. The bottom portion 42 of the inner cylinder portion 21 is closed by the separate covering member 43. The inner cylinder portion 21 is substantially the same as that of the first embodiment, except that the inner cylinder portion 21 of the present embodiment is not provided with a stepped portion at the opening 45.

As described above, the covering member 43 in the bottom portion 42 of the inner cylinder portion 21 is formed as a separate body. This eliminates the need for forming, in the outer claw portion 85, a recess through which a tool for forming the fitting inner diameter portions 27, the seal circumferential grooves 29 and 30, etc. in the bores 26 can be inserted. Therefore, strength can be maintained.

Figure 21:
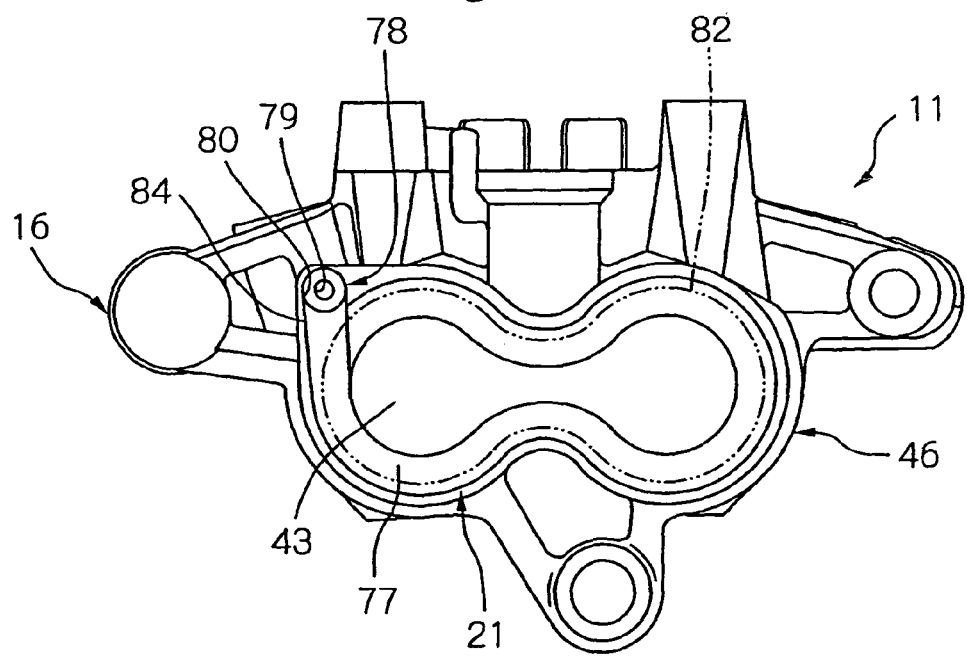
FIG. 21 is a rear view of an example of a modified caliper body of the disk brake according to the fifth embodiment of the present invention.

In the fifth embodiment also as described above, as shown in FIG. 20, when the covering member 43 is friction stir welded to the main part 46, the end position or the residual impression 78 can be formed on the closed-loop connecting portion 77, as in the first embodiment, or can be formed at a position outside the closed-loop connecting portion 77 by forming the extending portion 84 that extends outwardly from the closed-loop connecting portion 77, as shown in FIG. 21 and as in the second embodiment.

Below, the sixth embodiment of the present invention is described mainly with reference to FIGS. 22 and 23, focusing on differences from the third embodiment. It should be noted that elements in this embodiment that correspond to ones described in the third embodiment are designated by the same reference numerals, and descriptions thereof are omitted.

Figure 22:
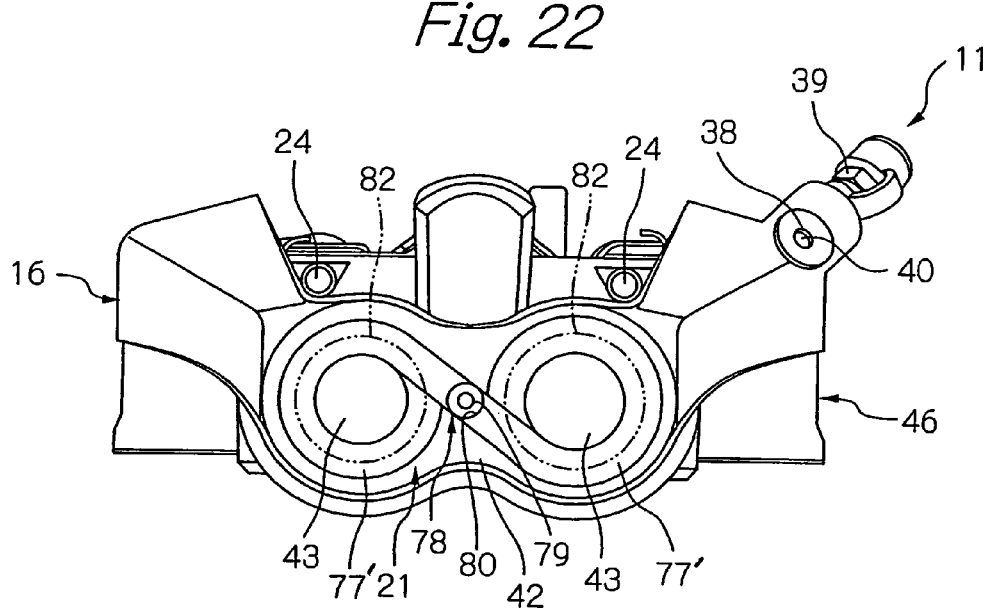
FIG. 22 is a rear view of a caliper of a disk brake according to a sixth embodiment of the present invention.
Figure 23:
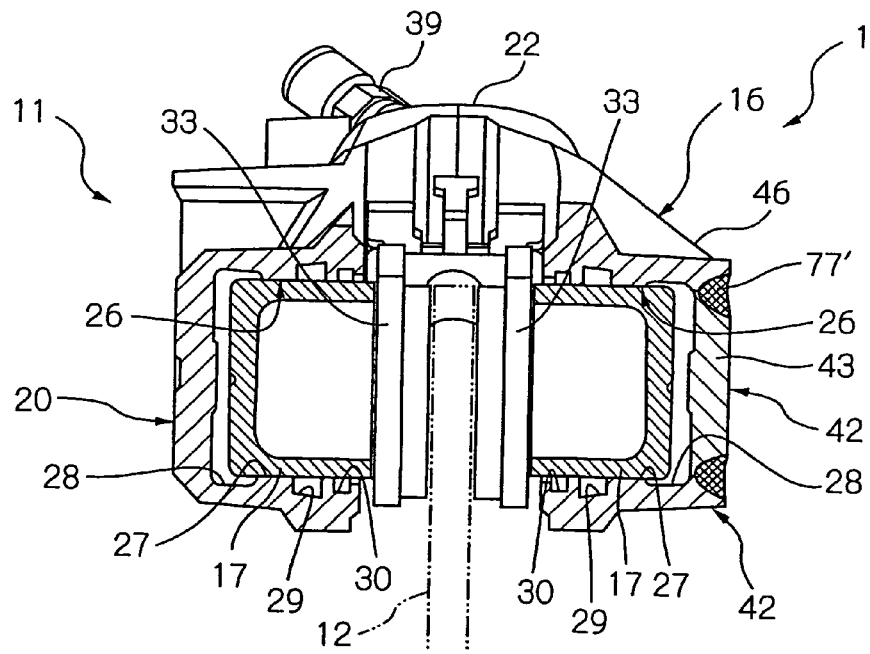
FIG. 23 is a sectional side elevation view of the caliper of the disk brake according to the sixth embodiment of the present invention.

In the sixth embodiment, as shown in FIGS. 22 and 23, the covering member 43 in the bottom portion 42 of the inner cylinder portion 21 of the main part 46 is formed individually in a circular shape for each of the bores 26 disposed in the disk circumferential direction. As in the third embodiment, each covering member 43 is fitted into the main part 45 from inside the main part 46, that is, from the side of the bores 26. However, it is also possible to fit each covering member 43 into the main part 46 from outside the main body 46, as in the first embodiment.

Further, the outer surface of the covering member 43 is disposed to be substantially level with the outer surface of the bottom portion 42 of the inner cylinder portion 21 of the main part 46. Then, while the covering member 43 is pressed against the main part 46 from the side of the bore 26 so as to prevent any movement of the covering member 43 relative to the main part 46, using a holding mechanism (not shown), the covering member 43 is attached to the main part 46 by means of friction stir welding performed from outside the main part 46. Specifically, the tip shaft portion 73 of the welding tool 71 shown in FIG. 7 is positioned in the vicinity of the connection boundary 82, that is, an abutting portion, and is moved along the connection boundary 82. Then, after performing friction stir welding through the entire circumference of one of the covering portions 43, the closed-loop connecting portion 77' of friction stir welding is further extended outward in a direction tangential to the bore 26, that is, to a portion, on a side of the main part 46, between the two covering members 43. Then, the welding tool 71 is removed. In this way, the residual impression 78 is formed at an outside portion that does not overlap with the closed-loop connecting portion 77' of the main body 46. Then, after performing friction stir welding through the entire circumference of the other covering portion 43, the closed-loop connecting portion 77' of friction stir welding is further extended outward in a direction tangential to the bore 26 to the position where the residual impression 78 is formed earlier, at which position the welding tool 71 is removed to thereby form the residual impression 78 anew.

It should be noted that the central hole 79 of the residual impression 78 is formed at a position that does not overlap with inner diameter portions of the bores 26 when viewed in the disk axial direction. Further, as in FIG. 22, the portions extending in the tangential direction from the closed-loop connecting portions 77' surrounding the two covering members 43 are formed in a single straight line.

In the sixth embodiment, as described above, the central hole 79 of the residual impression 78 is displaced outside the inner diameter portions of the bores 26 and is therefore separated from the bores 26. This makes it possible to prevent the central hole 79 and the bores 26 from communicating with each other, so that fluid leakage can be prevented more reliably. Further, since the positions of the residual impressions 78 formed earlier and later are superimposed to leave only one residual impression 78 during friction stir welding of the two covering members 43, the outer appearance can be improved, and, at the same time, the number of portions of possible fluid leakage can be reduced. Therefore, fluid leakage can be prevented more reliably. Further, since the portions extending in the tangential direction from the closed-loop connecting portions 77' encircling the two covering members 43, are formed in a single straight line, the friction stir welding processes for the two covering members 43 can be performed in the same direction of rotation (in FIG. 22, clockwise).

According to the sixth embodiment, as shown in FIG. 23, a connecting portion 77' between the covering members 43 and the main part 46 is friction stir welded, such that the connection boundary between the covering members 43 and the main part 46 completely disappears in the disk axial direction. This makes it possible to prevent a fluid pressure from exerting on any gap in the connection boundary between the covering member 43 and the main part 46 so as to cause any local stress, which in turn may cause cracking, etc. As a result, strength of the main part 46 can be maintained. It should be noted that, in the first to fifth embodiments as well, the connecting portion 77 between the covering members 43 and the main part 46 can be friction stir welded in such a manner that the connection boundary between the covering member(s) 43 and the main part 46 completely disappears in the disk axial direction.

Below, the seventh embodiment of the present invention is described mainly with reference to FIGS. 24 and 25, focusing on differences from the third embodiment. It should be noted that elements in this embodiment that correspond to ones described in the third embodiment are designated by the same reference numerals, and descriptions thereof are omitted.

Figure 24:
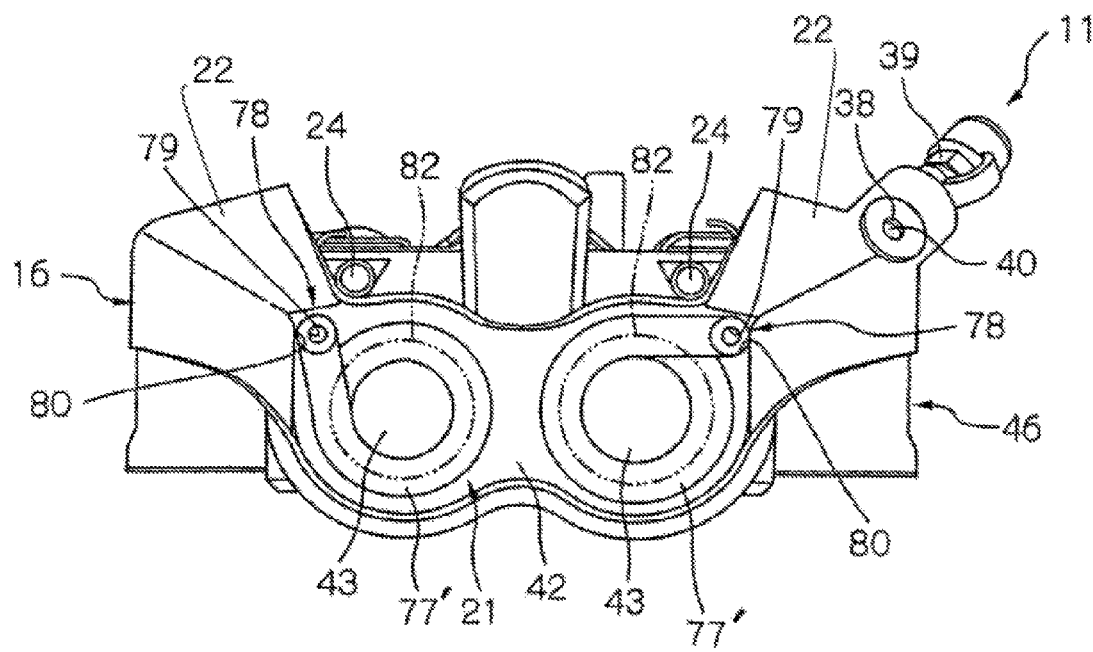
FIG. 24 is a rear view of a caliper of a disk brake according to a seventh embodiment of the present invention.

In the seventh embodiment, as shown in FIG. 24, when the covering members 43 are friction stir welded to the main part 46, the end positions of the friction stir welding processes where impressions of the welding tool 71 remain, that is, the residual impressions 78 are formed in the bottom portion 42 of the main body 46 at bulge portions of the outer circumferential portion in an upper right position of the right covering member 43 and an upper left position of the left covering member 43.

The central holes 79 of the residual impressions 78 are formed at positions that do not overlap with inner diameter portions of the bores 26 when viewed in the disk axial direction. Further, as shown in FIG. 24, the portions, which continue in tangential directions from the closed-loop connecting portions 77' encircling the right and left covering members 43, extend in different directions, that is, laterally and upward, respectively.

Figure 25:
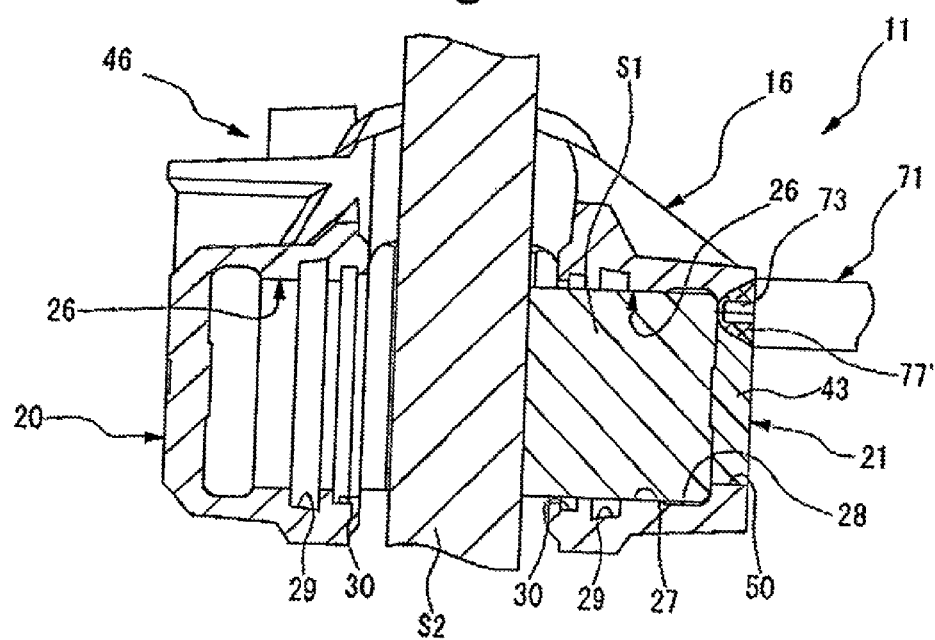
FIG. 25 is a sectional side elevation view of the main part of the disk brake according to the seventh embodiment of the present invention, showing a state of the friction stir welding.

Further, as shown in FIG. 25, the main part or cylinder body 46 has a cylinder portion 46a and an annular inner flange portion 46b provided on the bottom surface side of the cylinder portion 46a. The annular inner flange portion 46b forms a main open portion 50 of a uniform diameter that forms an opening on the right side (the bottom portion of the cylinder body) of the bore 26. The main open portion 50 has an inner diameter thereof smaller than that of the fitting inner diameter portion 27 of the bore 26. Further, the covering member 43, which fits into the main open portion 50, also has an outer circumferential portion of a uniform diameter. An axial position of the covering member 43 relative to the main part 46 is determined, using a support S1 inserted into the bore 26 and a support S2 for supporting the support S1. The support S1 has a flat surface that abuts against a flat portion on a bottom surface side of the inner annular flange portion 46b and against an inner flat portion (especially, a flat portion in the vicinity of an outer circumferential portion) of the covering member 43. The positioning of the covering member 43 relative to the main part 46 is performed, using the flat surface of the support S1. In this manner, the flat portion on the bottom surface side of the bore 26 and the inner flat portion of the covering member 43 become level with each other. Further, the support S1 is made of iron or the like whose melting point is higher than that of aluminum, which is a material used for the main part 46 and the covering member 43. During friction stir welding, the welding tool 71 for friction stir welding is operated, such that the tip shaft portion 73 thereof does not touch the flat surfaces of the support S1 but moves in the vicinity of it. In this manner, the connecting portion 77' between the covering members 43 and the main part 46 is friction stir welded in such a manner that the connection boundary between the covering member 43 and the main part 46 completely disappears in the disk axial direction.

As described above, friction stir welding is performed, such that the flat portion on the bottom surface side of the bore 26 and the inner flat portion of the covering member 43 become level with each other and that the connection boundary between the covering member 43 and the main part 46 disappear completely. Therefore, friction stir welding can be performed with improved precision, and strength and durability can be enhanced.

In the seventh embodiment, by displacing the central holes 79 of the residual impressions 78 outside the inner diameter portions of the bores 26 and thereby separating the central holes 79 from the respective bores 26 in the manner described above, it is possible to prevent the central holes 79 from communicating with the respective bores 26. As a result, fluid leakage can be prevented more reliably. Alternatively, it is also possible to perform the friction stir welding processes of the two covering members 43 in the same direction of rotation (in FIG. 24, clockwise) by extending, in different directions, the portions continuing in the respective tangential directions from the closed-loop connecting portions 77', which encircle the respective covering members 43, so as to form the residual impressions 78 at an upper right position of the right covering member 43 and an upper left position of the left covering member 43.

It should be noted that in the foregoing a disk brake has been described to provide an example of application of the present invention. However, the present invention can also be applied to other various types of cylinder apparatuses, such as a bottom portion of a master cylinder in which a brake fluid pressure is generated by stepping on a brake pedal.

Although only seven exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2005-030286 filed on Feb. 7, 2005 including specification, claims, drawings, and summary is incorporated herein by reference in its entirety.

The invention claimed is:

1. A method for manufacturing a disk brake comprising a first cylinder disposed on one side of a disk, a second cylinder disposed on the other side of the disk, and a disk pass portion connecting the first cylinder and the second cylinder on an outer radial side of the disk, wherein pistons are caused to slidingly move in bores of the first and second cylinders under application of a hydraulic pressure and thereby press a brake pad against a disk, the method comprising:
   providing a covering member in a bottom portion of the first cylinder;
   providing a cylinder body which has an opening that is closed by the covering member, the cylinder body comprising a cylinder portion defining an internal diameter portion of the bore, an inner annular flange portion extending radially inwardly from the bottom portion side of the cylinder portion and defining the opening, and an outer circumferential portion on the bottom portion of the first cylinder, wherein the opening has an inner diameter that is smaller than that of the bore, wherein a major part of the outer circumferential portion has a circular shape, and a part of the circular shaped outer circumferential portion is provided with a bulge portion extending outwardly in a radial direction of the cylinder portion;
   supporting the covering member and the inner annular flange portion by abutting a flat surface of a support inserted into the bore against a flat portion on the bore bottom surface side of the inner annular flange portion and an inner flat portion of the covering member so that the flat portion on the bore bottom surface side of the inner annular flange portion and the inner flat portion of the covering member become level with each other; and
   connecting the covering member and the cylinder body by friction stir welding along an entire periphery of the covering member while the flat surface of the support supports the inner annular flange portion and the covering member to form a connecting portion surrounding the covering member in the form of a closed loop, and then moving a welding tool outwardly in the radial direction of the cylinder body from the closed loop connecting portion through a substantial extent of the bulge portion such that a central hole of a residual impression of the welding tool is positioned outwardly of an inner diameter of the bore, and removing the welding tool from the cylinder body, to produce the first cylinder of the disk brake from the covering member and the cylinder body,
   wherein the bulge portion is formed at a position corresponding to the disk pass portion in the circumferential direction of the cylinder body, and the bulge portion extends continuously from an outer end surface on the bottom portion side of the first cylinder to the disk pass portion in the axial direction of the disk, and
   wherein the bulge portion includes a flat surface continuous with the outer end surface of the first cylinder.

2. A method according to claim 1, wherein the connecting portion is friction stir welded by the flat portion of the bottom surface side of the bore and the inner flat portion of the covering member in such a manner that a connection boundary between the covering member and the cylinder body completely disappears in the axial direction of the cylinder body.

3. A method according to claim 2, wherein, during friction stir welding, the welding tool for friction stir welding is operated such that a tip shaft portion of the tool does not touch the flat surface of the support but moves in the vicinity of the flat surface, whereby the connection portion between the covering member and the cylinder body is friction stir welded in such a manner that the connection boundary between the covering member and the cylinder body completely disappears in the axial direction of the cylinder body.

4. A method according to claim 2, wherein a rounded portion is formed between the flat portion on the bore bottom surface side of the inner annular flange portion and the internal diameter portion of the bore prior to friction stir welding, and wherein after friction stir welding, the connecting portion at the inner surface of the bore and the internal diameter portion of the bore are connected to each other by the rounded portion.

5. A method according to claim 1, wherein the bore comprises a fitting internal diameter portion which fittingly holds the piston such that the piston is capable of slidably moving therein, and an enlarged internal diameter portion which is located behind the fitting internal diameter portion and has a diameter that is larger than that of the fitting internal diameter portion, wherein the enlarged internal diameter portion of the bore and the connecting portion on the inner surface of the bore are connected to each other by a rounded portion, and wherein the central hole of the residual impression of the welding tool is positioned outward of the enlarged internal diameter portion of the bore.

6. A method according to claim 1, wherein the first cylinder comprises a plurality of bores that are disposed in parallel and wherein the covering member is friction stir welded to the cylinder body, such that the covering member covers the opening, which extends over the plurality of bores, from outside the cylinder body.

7. A method according to claim 1, wherein the first cylinder comprises two bores that are disposed in parallel, wherein separate covering members are friction stir welded to the cylinder body in a state where the separate covering members cover openings of the respective bores, and the separate covering members constitute a left covering member and a right covering member, and
    wherein the bulge portion is for the right covering member and is formed at an upper right position of the right covering member corresponding to the position of the disk pass portion, and a bulge portion for the left covering member is formed at an upper left position of the left covering member corresponding to the position of the disk pass portion, the bulge portions being disposed in symmetrical positions.

8. A method according to claim 1, wherein the disk brake further comprises a vehicle mounting portion for radially mounting the disk brake on a non-rotatable portion of a vehicle, the vehicle mounting portion being disposed on the second cylinder side of the disk brake.

9. A method according to claim 1, wherein the support comprises a first support and a second support, the first support having the flat surface and being inserted into the bore, the second support being provided on a side of the first support opposite the flat surface of the first support, and
    wherein the second support is provided between the first cylinder and the second cylinder, and the second support supports the first support in the axial direction of the first support.

10. A method according to claim 1, wherein the flat surface of the bulge portion extends contiguously from the outer end surface on the bottom portion side of the first cylinder, and extends radially outwardly from the first cylinder.

11. A method according to claim 1, wherein the flat surface of the bulge portion extends contiguously from the outer end surface on the bottom portion side of the first cylinder, and extends radially outwardly from the first cylinder,
    wherein the residual impression of the welding tool is disposed on the bulge portion.

12. A method according to claim 1, wherein the residual impression of the welding tool is disposed on the bulge portion.

13. A method for manufacturing a disk brake comprising a first cylinder disposed on one side of a disk, a second cylinder disposed on the other side of the disk, and a disk pass portion connecting the first cylinder and the second cylinder on an outer radial side of the disk, wherein pistons are caused to slidingly move in bores of the first and second cylinders under application of a hydraulic pressure and thereby press a brake pad against a disk, the method comprising:
    providing a covering member, which is made of aluminum and is provided in a bottom portion of the first cylinder;
    providing a cylinder body which is made of aluminum and has an opening that is closed by the covering member, the cylinder body comprising a cylinder portion defining an internal diameter portion of the bore, an inner annular flange portion extending radially inwardly from the bottom portion side of the cylinder portion and defining the opening, and an outer circumferential portion on the bottom portion of the first cylinder, wherein the opening has an inner diameter that is smaller than that of the bore, wherein a major part of the outer circumferential portion has a circular shape, and a part of the circular shaped outer circumferential portion is provided with a bulge portion extending outwardly in a radial direction of the cylinder portion, the bore comprising a fitting internal diameter portion which fittingly holds the piston such that the piston is capable of slidably moving therein, and an enlarged internal diameter portion which is located behind the fitting internal diameter portion and has a diameter that is larger than that of the fitting internal diameter portion, a rounded portion being formed between a flat portion on the bore bottom surface side of the inner annular flange portion and the enlarged internal diameter portion of the bore;
    supporting the covering member and the inner annular flange portion by abutting a flat surface of a support inserted into the bore against a flat portion on the bore bottom surface side
    of the inner annular flange portion and abutting the same flat surface of the support against an inner flat portion of the covering member so that the flat portion on the bore bottom surface side of the inner flange portion and the inner flat portion of the covering member become level with each other, the support being made of a material whose melting point is higher than that of aluminum, the support comprising a first support and a second support, the first support having the flat surface and being inserted into the bore, the second support being provided on a side of the first support opposite the flat surface of the first support and supporting the first support in an axial direction of the first support;
    connecting the covering member and the cylinder body by friction stir welding an entire periphery of the covering member while the flat surface of the support supports the inner annular flange portion and the covering member to form a connecting portion surrounding the covering member in the form of a closed loop; and
    moving a welding tool outwardly in the radial direction of the cylinder body from the closed loop connecting portion through a substantial extent of the bulge portion such that a central hole of a residual impression of the welding tool is positioned outwardly of an inner diameter of the enlarged internal diameter portion of the bore and removing the welding tool from the cylinder body, to produce the first cylinder from the covering member and the cylinder body,
    wherein the bulge portion is formed at a position corresponding to the disk pass portion in the circumferential direction of the cylinder body, and the bulge portion extends continuously from an outer end surface on the bottom portion side of the first cylinder to the disk pass portion in the axial direction of the disk,
    wherein the bulge portion includes a flat surface continuous from the outer end surface of the first cylinder, and
    wherein the connecting portion is friction stir welded by the flat portion of the bottom surface side of the bore and the inner flat portion of the covering member in such a manner that a connection boundary between the covering member and the cylinder body completely disappears in the axial direction of the cylinder body, wherein the connecting portion on an inner surface of the bore and the enlarged internal diameter portion of the bore are connected to each other by the rounded portion.

14. A method according to claim 13, wherein the second support is provided between the first cylinder and the second cylinder, and the second support supports the first support in the axial direction of the first support.

15. A method according to claim 13, wherein a rounded portion is formed between the flat portion on the bore bottom surface side of the inner annular flange portion and the enlarged internal diameter portion of the bore prior to friction stir welding, and wherein, after friction stir welding, the connecting portion at the inner surface of the bore and the enlarged internal diameter portion of the bore are connected to each other by the rounded portion.

16. A method according to claim 13, wherein the first cylinder comprises two bores that are disposed in parallel, wherein separate covering members are friction stir welded to the cylinder body in a state where the separate covering members cover openings of the respective bores, and the separate covering members constitute a left covering member and a right covering member, and wherein the bulge portion is for the right covering member and is formed at an upper right position of the right covering member corresponding to the position of the disk pass portion, and a bulge portion for the left covering member is formed at an upper left position of the left covering member corresponding to the position of the disk pass portion, the bulge portions being disposed in symmetrical positions.

17. A method according to claim 13, wherein the disk brake further comprises a vehicle mounting portion for radially mounting the disk brake on a non-rotatable portion of a vehicle, the vehicle mounting portion being disposed on the second cylinder side of the disk brake.

18. A method according to claim 13, wherein the flat surface of the bulge portion extends contiguously from the outer end surface on the bottom portion side of the first cylinder, and extends radially outwardly from the first cylinder.

19. A method according to claim 13, wherein the flat surface of the bulge portion extends contiguously from the outer end surface on the bottom portion side of the first cylinder, and extends radially outwardly from the first cylinder, and wherein the residual impression of the welding tool is disposed on the bulge portion.

20. A method according to claim 13, wherein the residual impression of the welding tool is disposed on the bulge portion.

* * * * *